United States Patent
Boivin et al.

(10) Patent No.: US 10,569,815 B2
(45) Date of Patent: Feb. 25, 2020

(54) VEHICLE AIR DRAG REDUCING APPARATUS AND METHOD OF USE THEREOF

(71) Applicant: TRANSTEX COMPOSITE INC., Montreal (CA)

(72) Inventors: Mathieu Boivin, MontRoyal (CA); Sylvain Daoust, Vaudreuil-Dorion (CA); Walid Deir, Lachine (CA); George Bassily, Laval (CA); Ali Fellah Jahromi, Saint-Laurent (CA); Guillaume Desourdy, Terrebonne (CA)

(73) Assignee: Transtex Inc., Montreal (CA)

( * ) Notice: Subject to any disclaimer, the term of this patent is extended or adjusted under 35 U.S.C. 154(b) by 40 days.

(21) Appl. No.: 15/848,734

(22) Filed: Dec. 20, 2017

(65) Prior Publication Data

US 2018/0244324 A1    Aug. 30, 2018

Related U.S. Application Data

(60) Provisional application No. 62/464,130, filed on Feb. 27, 2017.

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC .......................... B62D 35/001; B62D 35/007
See application file for complete search history.

(56) References Cited

U.S. PATENT DOCUMENTS

| | | |
|---|---|---|
| 3,010,754 A | 11/1961 | Shumaker |
| 4,142,755 A | 3/1979 | Keedy |
| 4,214,787 A | 7/1980 | Chain |
| 4,257,641 A | 3/1981 | Keedy |
| 4,458,936 A | 7/1984 | Mulholland |
| 4,508,380 A | 4/1985 | Sankrithi |
| 4,682,808 A | 7/1987 | Bilanin |
| 4,702,509 A | 10/1987 | Elliott, Sr. |
| 4,741,569 A | 5/1988 | Sutphen |
| 4,978,162 A | 12/1990 | Labbe |
| 5,240,306 A | 8/1993 | Flemming |
| 5,348,366 A | 9/1994 | Baker |
| 5,375,903 A | 12/1994 | Lechner |
| 5,823,610 A | 10/1998 | Ryan |
| 6,092,861 A | 7/2000 | Whelan |
| 6,286,894 B1 | 9/2001 | Kingham |
| 6,309,010 B1 | 10/2001 | Whitten |
| 6,457,766 B1 | 10/2002 | Telnack |
| 6,467,833 B1 | 10/2002 | Travers |
| 6,485,087 B1 | 11/2002 | Roberge |

(Continued)

FOREIGN PATENT DOCUMENTS

| | | |
|---|---|---|
| CA | 2004059 | 11/1989 |
| CA | 2281064 | 8/1999 |

(Continued)

*Primary Examiner* — Lori L Lyjak
(74) *Attorney, Agent, or Firm* — Mathieu Audet

(57) ABSTRACT

This invention relates to a retractable aerodynamic air drag reducing apparatus for reducing the air drag of a vehicle, the retractable aerodynamic air drag reducing apparatus being adapted to move between an expanded configuration and a retracted configuration on a basis of a signal from the vehicle.

20 Claims, 24 Drawing Sheets

(56) References Cited

U.S. PATENT DOCUMENTS

| | | |
|---|---|---|
| 6,595,578 B1 | 7/2003 | Calsoyds |
| 7,147,270 B1 | 12/2006 | Andrus |
| 7,243,980 B2 | 7/2007 | Vala |
| 7,618,086 B2 | 11/2009 | Breidenbach |
| 7,748,771 B2 | 7/2010 | Distel |
| 7,845,708 B2 | 12/2010 | Breidenbach |
| 7,854,468 B2 | 12/2010 | Vogel |
| 7,857,376 B2 | 12/2010 | Breidenbach |
| 7,950,720 B2 | 5/2011 | Skopic |
| 8,033,594 B2 | 10/2011 | Nusbaum |
| 8,100,461 B2 | 1/2012 | Smith |
| 8,136,868 B2 | 3/2012 | Nusbaum |
| 8,162,381 B2 | 4/2012 | Tertnes |
| 8,177,287 B2 | 5/2012 | Vogel |
| 8,235,456 B2 | 8/2012 | Nusbaum |
| 8,360,509 B2 | 1/2013 | Smith |
| 8,360,510 B2 | 1/2013 | Smith |
| 8,550,539 B1 | 10/2013 | Anderson |
| 8,579,360 B2 | 11/2013 | Litchfield |
| 8,608,228 B2 | 12/2013 | Visentin |
| 8,672,391 B1 | 3/2014 | Cobb |
| 8,696,047 B2 | 4/2014 | Nusbaum |
| 8,708,399 B2 | 4/2014 | Smith |
| 8,770,650 B1 | 7/2014 | Brosseau |
| 8,783,757 B2 | 7/2014 | Henderson |
| 8,820,817 B1 | 9/2014 | Anderson |
| 8,845,007 B2 | 9/2014 | Ryan |
| 8,851,554 B2 | 10/2014 | Wayburn |
| 8,911,000 B2 | 12/2014 | Nusbaum |
| 8,925,997 B2 | 1/2015 | Hjelm |
| 8,973,972 B2 | 3/2015 | Dieckmann |
| 8,973,974 B2 | 3/2015 | Kunkel |
| 8,985,677 B2 | 3/2015 | Wiegel |
| 9,039,069 B2 | 5/2015 | Smith |
| 9,079,623 B2 | 7/2015 | Bernhardt |
| 9,139,238 B2 | 9/2015 | Visser |
| 9,145,177 B2 | 9/2015 | Smith |
| 9,168,959 B2 | 10/2015 | Smith |
| 9,180,919 B2 | 11/2015 | Breidenbach |
| 9,199,673 B2 | 12/2015 | Baker |
| 9,296,434 B2 | 3/2016 | Anderson |
| 9,346,496 B2 | 5/2016 | Breidenbach |
| 9,440,688 B2 | 9/2016 | Smith |
| 9,457,847 B2 * | 10/2016 | Smith ................. B62D 35/001 |
| 9,487,250 B2 | 11/2016 | Morrison |
| 9,505,449 B2 | 11/2016 | Telnack |
| 9,522,706 B1 | 12/2016 | Breidenbach |
| 9,527,534 B2 | 12/2016 | Knobloch |
| 9,545,960 B2 * | 1/2017 | Smith ................. B62D 35/001 |
| 9,545,961 B2 | 1/2017 | Breidenbach |
| 9,555,841 B1 | 1/2017 | Roush |
| 9,580,117 B1 | 2/2017 | Krstovic |
| 9,616,944 B2 | 4/2017 | Baker |
| 9,616,945 B1 | 4/2017 | Henderson |
| 9,637,182 B2 | 5/2017 | Wayburn |
| 9,637,184 B1 | 5/2017 | Bennett |
| 9,650,086 B1 | 5/2017 | Pfaff |
| 9,682,734 B2 | 6/2017 | Reeder |
| 9,776,674 B2 | 10/2017 | Baker |
| 9,815,504 B2 | 11/2017 | Buffo |
| 9,815,505 B2 | 11/2017 | Wiegel |
| 9,815,507 B2 | 11/2017 | Breidenbach |
| 9,834,261 B2 | 12/2017 | Dieckmann |
| 9,834,262 B2 | 12/2017 | Baker |
| 9,845,118 B2 | 12/2017 | Dieckmann |
| 9,855,982 B2 | 1/2018 | Baker |
| 9,868,477 B2 | 1/2018 | Breidenbach |
| 9,873,466 B2 | 1/2018 | Tuerk |
| 9,873,467 B2 | 1/2018 | Wall, II |
| 9,896,138 B2 | 2/2018 | De Bock |
| 2006/0273625 A1 | 12/2006 | Andrus |
| 2007/0029837 A1 | 2/2007 | Vala |
| 2007/0046066 A1 | 3/2007 | Cosgrove |
| 2007/0176465 A1 | 8/2007 | Wood |
| 2008/0093886 A1 | 4/2008 | Nusbaum |
| 2008/0164722 A1 | 7/2008 | Breidenbach |
| 2008/0303310 A1 | 12/2008 | Breidenbach |
| 2008/0309122 A1 | 12/2008 | Smith |
| 2009/0140542 A1 | 6/2009 | Breidenbach |
| 2009/0200834 A1 | 8/2009 | Vogel |
| 2009/0212594 A1 | 8/2009 | Breidenbach |
| 2009/0236872 A1 | 9/2009 | Wood |
| 2009/0256386 A1 | 10/2009 | Wood |
| 2009/0295189 A1 | 12/2009 | Distel |
| 2010/0123333 A1 | 5/2010 | Breidenbach |
| 2010/0164249 A1 | 7/2010 | Nusbaum |
| 2010/0225143 A1 | 9/2010 | Skopic |
| 2011/0037291 A1 | 2/2011 | Pickering |
| 2011/0068603 A1 | 3/2011 | Domo |
| 2011/0084516 A1 | 4/2011 | Smith |
| 2011/0084517 A1 | 4/2011 | Vogel |
| 2011/0101730 A1 | 5/2011 | Tertnes |
| 2011/0115254 A1 | 5/2011 | Skopic |
| 2011/0148140 A1 | 6/2011 | Benton |
| 2011/0175394 A1 | 7/2011 | Breidenbach |
| 2011/0221231 A1 | 9/2011 | Visser |
| 2011/0304173 A1 | 12/2011 | Breidenbach |
| 2012/0025565 A1 | 2/2012 | Nusbaum |
| 2012/0086234 A1 | 4/2012 | Visser |
| 2012/0104791 A1 * | 5/2012 | Visentin ................. B61D 17/02 296/180.2 |
| 2012/0104792 A1 | 5/2012 | Smith |
| 2012/0119540 A1 | 5/2012 | Breidenbach |
| 2012/0139291 A1 | 6/2012 | Nusbaum |
| 2012/0223544 A1 | 9/2012 | Benton |
| 2012/0261945 A1 | 10/2012 | Litchfield |
| 2012/0292945 A1 | 11/2012 | Nusbaum |
| 2013/0038086 A1 | 2/2013 | Breidenbach |
| 2013/0057019 A1 | 3/2013 | Breidenbach |
| 2013/0057020 A1 | 3/2013 | Burrell |
| 2013/0076063 A1 | 3/2013 | Ryan |
| 2013/0076064 A1 * | 3/2013 | Smith ................. B62D 35/001 296/180.1 |
| 2013/0076068 A1 | 3/2013 | Wayburn |
| 2013/0106136 A1 | 5/2013 | Smith |
| 2013/0113235 A1 | 5/2013 | Henderson |
| 2013/0175824 A1 | 7/2013 | Smith |
| 2013/0181478 A1 | 7/2013 | Litchfield |
| 2013/0214557 A1 | 8/2013 | Smith |
| 2013/0241232 A1 | 9/2013 | Ryan |
| 2013/0297154 A1 * | 11/2013 | Burchett ............... B62D 35/001 701/49 |
| 2014/0019010 A1 * | 1/2014 | Smith ................. B62D 35/001 701/49 |
| 2014/0021741 A1 | 1/2014 | Nusbaum |
| 2014/0021743 A1 | 1/2014 | Nusbaum |
| 2014/0035317 A1 | 2/2014 | Anderson |
| 2014/0077526 A1 | 3/2014 | Breidenbach |
| 2014/0110969 A1 | 4/2014 | Hjelm |
| 2014/0117713 A1 | 5/2014 | Baker |
| 2014/0125088 A1 | 5/2014 | Wiegel |
| 2014/0132031 A1 | 5/2014 | Dieckmann |
| 2014/0217775 A1 | 8/2014 | Breidenbach |
| 2014/0292023 A1 | 10/2014 | Visser |
| 2014/0292024 A1 | 10/2014 | Smith |
| 2014/0319870 A1 | 10/2014 | Breidenbach |
| 2014/0339854 A1 | 11/2014 | Tuerk |
| 2014/0346807 A1 | 11/2014 | Breidenbach |
| 2014/0346808 A1 | 11/2014 | Bernhardt |
| 2014/0367993 A1 | 12/2014 | Breidenbach |
| 2015/0008700 A1 | 1/2015 | Ryan |
| 2015/0008701 A1 | 1/2015 | Ryan |
| 2015/0035312 A1 | 2/2015 | Grandominico |
| 2015/0035313 A1 | 2/2015 | Wayburn |
| 2015/0102633 A1 | 4/2015 | Dieckmann |
| 2015/0115651 A1 | 4/2015 | Conboy |
| 2015/0166129 A1 | 6/2015 | Camosy |
| 2015/0175221 A1 | 6/2015 | Popa |
| 2015/0197292 A1 | 7/2015 | Smith |
| 2015/0210323 A1 | 7/2015 | Morrison |
| 2015/0217814 A1 * | 8/2015 | Wiegel ................. B62D 35/001 296/180.4 |
| 2015/0239512 A1 | 8/2015 | Smith |
| 2015/0266520 A1 | 9/2015 | Breidenbach |

(56) References Cited

U.S. PATENT DOCUMENTS

| | | |
|---|---|---|
| 2015/0274220 A1 | 10/2015 | Telnack |
| 2015/0291231 A1 | 10/2015 | Smith |
| 2015/0329152 A1 | 11/2015 | Baker |
| 2015/0367900 A1 | 12/2015 | Buffo |
| 2016/0009322 A1 | 1/2016 | Telnack |
| 2016/0046333 A1 | 2/2016 | Baker |
| 2016/0068200 A1* | 3/2016 | Dieckmann ......... B62D 35/001 296/180.4 |
| 2016/0152285 A1 | 6/2016 | Wiegel |
| 2016/0167720 A1 | 6/2016 | Breidenbach |
| 2016/0185399 A1 | 6/2016 | Smith |
| 2016/0200377 A1 | 7/2016 | Grandominico |
| 2016/0214661 A1 | 7/2016 | Knobloch |
| 2016/0236726 A1 | 8/2016 | Baker |
| 2016/0251040 A1 | 9/2016 | De Bock |
| 2016/0304138 A1 | 10/2016 | Dieckmann |
| 2016/0318559 A1 | 11/2016 | Baker |
| 2016/0325792 A1 | 11/2016 | Telnack |
| 2016/0347380 A1 | 12/2016 | Dieckmann |
| 2017/0021872 A1 | 1/2017 | Breidenbach |
| 2017/0029044 A1 | 2/2017 | Senatro |
| 2017/0057564 A1 | 3/2017 | Breidenbach |
| 2017/0096179 A1 | 4/2017 | Wall, II |
| 2017/0120966 A1 | 5/2017 | Breidenbach |
| 2017/0129550 A1 | 5/2017 | Baker |
| 2017/0158256 A1 | 6/2017 | Smith |
| 2017/0158260 A1 | 6/2017 | Breidenbach |
| 2017/0166266 A1 | 6/2017 | Wall, II |
| 2017/0259857 A1 | 9/2017 | Breidenbach |
| 2017/0267293 A1 | 9/2017 | Reeder |
| 2017/0274941 A1 | 9/2017 | Kantharaju |
| 2017/0305478 A1 | 10/2017 | Regan |
| 2017/0320527 A1 | 11/2017 | Bacon |
| 2017/0361881 A1 | 12/2017 | Baker |
| 2017/0369107 A1 | 12/2017 | Grandominico |
| 2018/0001941 A1 | 1/2018 | Polidori |
| 2018/0037276 A1 | 2/2018 | Elogab |
| 2018/0043943 A1 | 2/2018 | Polidori |
| 2018/0050742 A1 | 2/2018 | Smith |

FOREIGN PATENT DOCUMENTS

| | | |
|---|---|---|
| CA | 2583852 | 4/2007 |
| CA | 2723882 | 5/2008 |
| CA | 2830680 | 10/2013 |
| CA | 2849696 | 4/2014 |
| CA | 2853727 | 4/2014 |
| CA | 2891265 | 5/2015 |
| CA | 2921058 | 2/2016 |
| CA | 2928493 | 4/2016 |

* cited by examiner

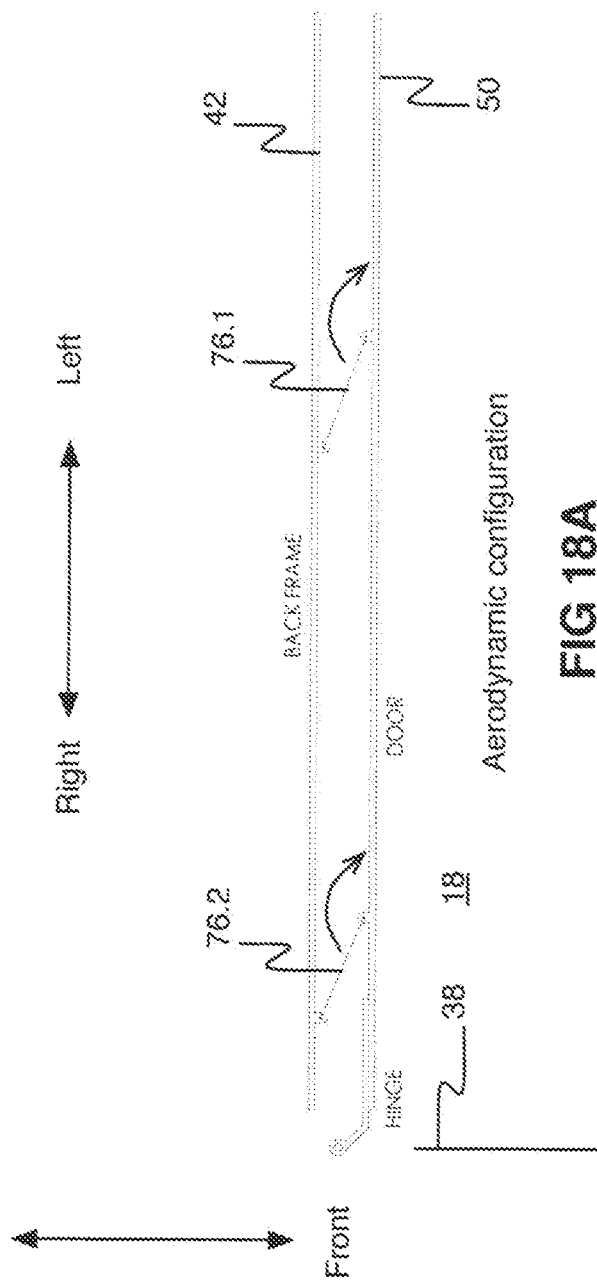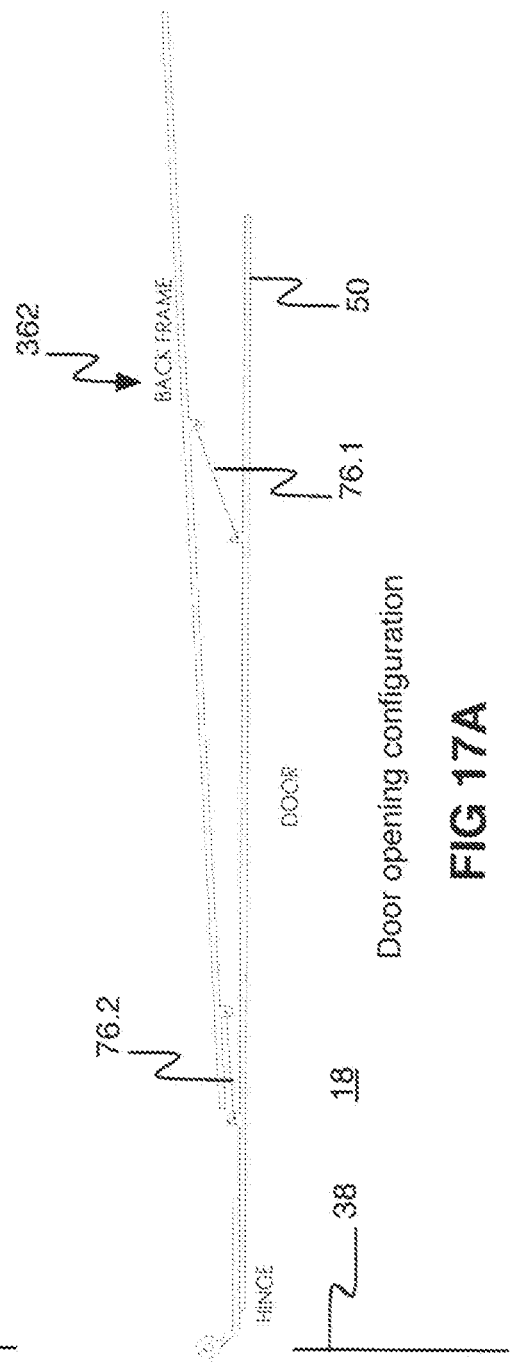

VEHICLE AIR DRAG REDUCING APPARATUS AND METHOD OF USE THEREOF

CROSS-REFERENCE

The present application relates to and is a non-provisional application of U.S. provisional application No. 62/464,130 filed Feb. 27, 2017 entitled VEHICLE AIR DRAG REDUCING APPARATUS AND METHOD OF USE THEREOF, this document is incorporated herein by reference in its entirety.

FIELD OF THE INVENTION

This invention relates to an aerodynamic drag reducing apparatus adapted to be mounted on a rear portion of a trailer to improve the aerodynamic efficiency of the trailer. The present invention more precisely relates to a vehicle retractable drag-reducing apparatus.

BACKGROUND OF THE INVENTION

Road tractors are generally used to pull trailers on roads to transport cargo. Aerodynamic apparatuses can be installed on the road tractor and/or on the trailer in order to reduce the aerodynamic air drag and improve fuel efficiency.

Rear drag-reducing apparatuses are generally installed and secured to a rear portion of a trailer to help manage the flow of air behind the trailer. It is known that a significant amount of air drag results when a vehicle travels over a roadway; this is due to an area of low pressure created at the rear end of the vehicle. For example, with a tractor-trailer type vehicle, the air makes a sharp bend around the squared-off back of the trailer, thus causing turbulence and drag. To overcome this problem, engine power is required and therefore fuel. Furthermore, the turbulence also causes poor visibility in rainy conditions and an accumulation of dirt on the back of trailers.

In the trucking industry, the aerodynamics of vehicles is a growing concern. Tests indicate that fuel savings from aerodynamic improvements are equivalent to fuel savings attained by a chassis weight reduction and require fewer services to maintain. The air resistance or aerodynamic drag of the vehicle increases the power needed by the engine as the speed increases. It is known that a tractor-trailer needs about 100 HP to overtake the air drag at a speed of 55 MPH. Approximately half the energy reaching the drive wheels is required to overcome air resistance at cruising speed. Recent tests reveal that the square back end contributes approximately to 30% of the air drag. Therefore, the addition of aerodynamic device, such as a rear deflector, diminishes the air drag and results in lower fuel consumption.

Various devices have been proposed to reduce air drag. One air drag reducing apparatus may be found described in U.S. Pat. No. 4,214,787 issued Jul. 29, 1980 to Chain wherein a pair of trim panels are pivotally connected to the rear end of the vehicle with control means connected between each trim panel and the rear end of the vehicle for maintaining the trim panel in an upward position when the vehicle is moving at a rate exceeding a predetermined minimum velocity. The drag reducing apparatus described in this patent includes a control assembly, which automatically controls the movement of the trim panels between an operating position and a storage position adjacent the vehicle doors. The control system comprises a panel actuator in the form of a ram, which is responsible to the application of pressurized fluid or air by the operator of the vehicle to maintain the panel in the drag reducing position. However, in this drag apparatus, the ram construction does not enable the doors to be moved between a closed position to a completely opened position where the doors are adjacently parallel to the sides of the trailer vehicle.

U.S. Pat. No. 6,485,087 teaches another air drag-reducing apparatus with foldable panels. The panels are manually operated and needs to be folded before opening the doors of the trailer prior to dock the trailer for adding or removing cargo therein.

Therefore, there exists a need in the art for an improved air drag reducing apparatus over the existing art. There is a need in the art for such an air drag reducing apparatus that can be easily expanded and collapsed. There is also a need for an air drag reducing apparatus that can be economically manufactured. There is also a need in the art for an improved air drag reducing apparatus that can be automatically expanded and collapsed. Moreover, there is also a need for an air drag reducing apparatus assembly that is appropriately sustaining vibrations caused by the vehicle circulating on the road.

SUMMARY OF THE INVENTION

It is one aspect of the present invention to alleviate one or more of the drawbacks of the background art by addressing one or more of the existing needs in the art.

Accordingly, an aspect of our work, in accordance with at least one embodiment thereof, provides an improved retractable aerodynamic air drag reducing apparatus over the prior art.

An aspect of our work, in accordance with at least one embodiment thereof, provides an automatically retractable aerodynamic air drag reducing apparatus adapted to be installed on a trailer to reduce the aerodynamic drag produced by the movement of the trailer when pulled by a vehicle.

An aspect of our work, in accordance with at least one embodiment thereof, provides an aerodynamic air drag reducing apparatus adapted to be installed on a trailer to reduce the aerodynamic drag produced by the movement of the trailer when pulled by a vehicle that can be swayed-away between a trailer door-opening configuration and an aeronautical configuration.

An aspect of our work, in accordance with at least one embodiment thereof, provides an aerodynamic air drag reducing apparatus adapted to be installed on a trailer to reduce the aerodynamic drag produced by the movement of the trailer when pulled by a vehicle that has an optimized panels geometry and intervening angles thereof.

An aspect of our work, in accordance with at least one embodiment thereof, provides a retractable aerodynamic air drag reducing apparatus that is expanded and retracted according to a signal provided by the vehicle speed. Other external signals, such as GPS or phone tower triangulation, are also contemplated in the aspect of our work.

An aspect of our work, in accordance with at least one embodiment thereof, provides a retractable aerodynamic air drag reducing apparatus that is expanded in an aerodynamic configuration and retracted by a pivotable member operatively connected to panels of the retractable aerodynamic air drag reducing apparatus.

An aspect of our work, in accordance with at least one embodiment thereof, provides a retractable aerodynamic air drag reducing apparatus that can be universally, easily installed and economically manufactured.

An aspect of our work, in accordance with at least one embodiment thereof, provides a retractable aerodynamic air drag reducing apparatus adapted to be automatically and manually operated.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure:

FIG. 17A is a top plan view of an exemplary sway-away mechanism for actuating the retractable aerodynamic air drag reducing apparatus, in n aerodynamic configuration, in accordance with at least one embodiment thereof;

FIG. 18A is a top plan view of an exemplary sway-away mechanism for actuating the retractable aerodynamic air drag reducing apparatus, in an aerodynamic configuration, in accordance with at least one embodiment thereof;

DETAILED DESCRIPTION OF PREFERRED EMBODIMENTS

A preferred embodiment of the present invention is described below with reference to the drawings.

Figure 1:
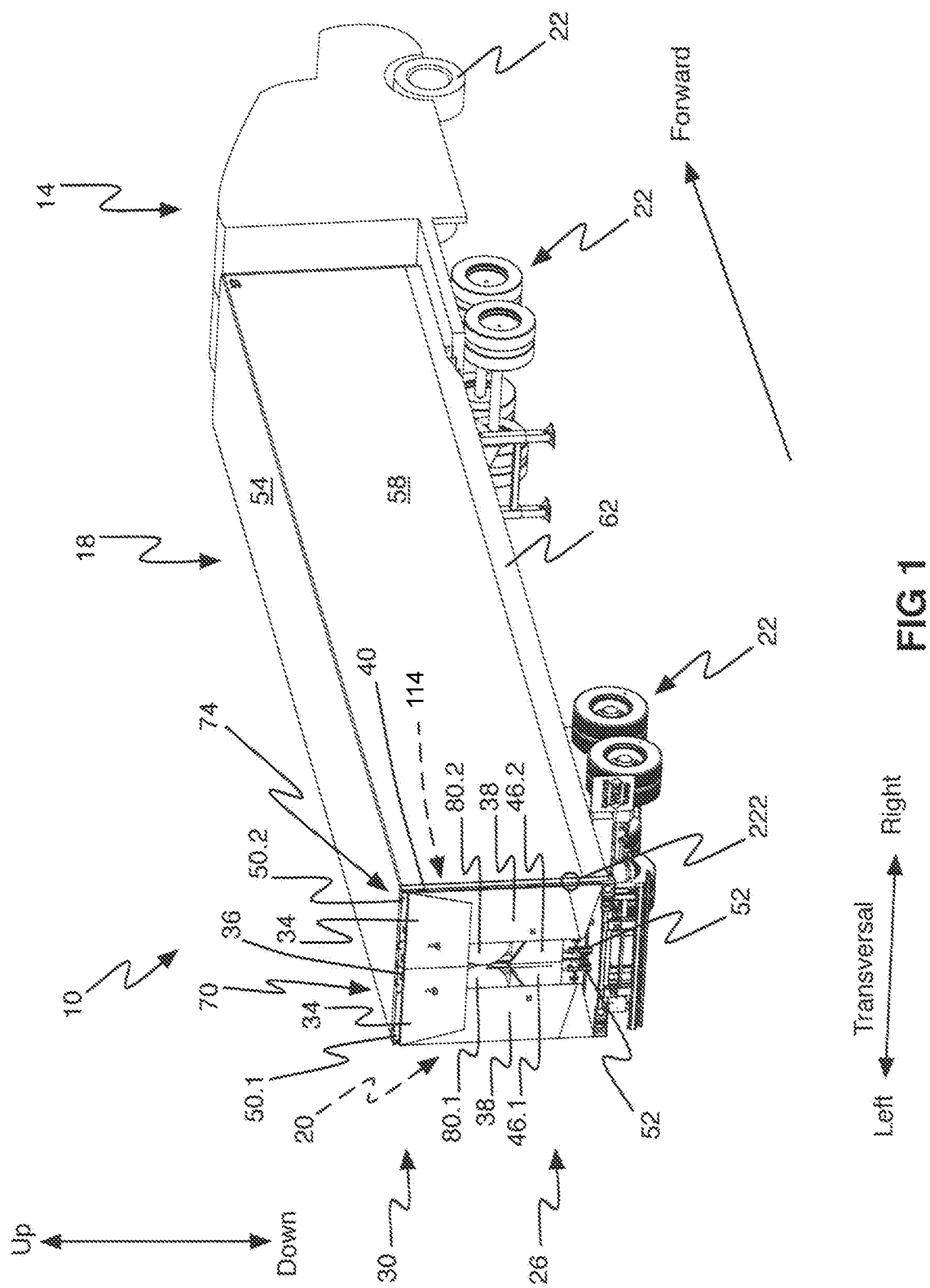
FIG. 1 is a rear-right perspective view of a road tractor operatively connected to a trailer including a retractable aerodynamic air drag reducing apparatus secured thereto in its retracted configuration, in accordance with at least one embodiment thereof.
Figure 6:
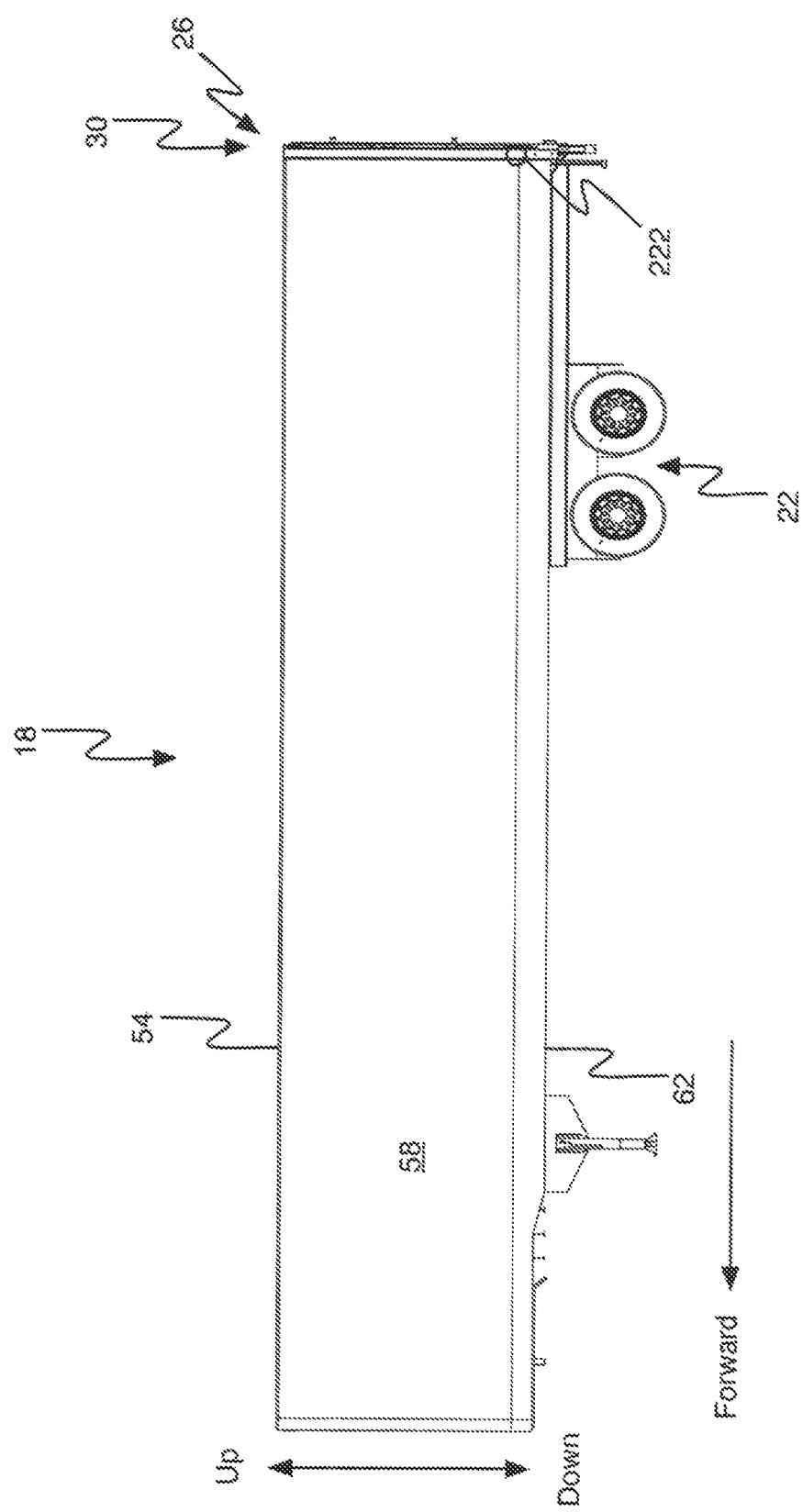
FIG. 6 is left elevational view of the trailer of FIG. 1, in accordance with at least one embodiment thereof.
Figure 7:
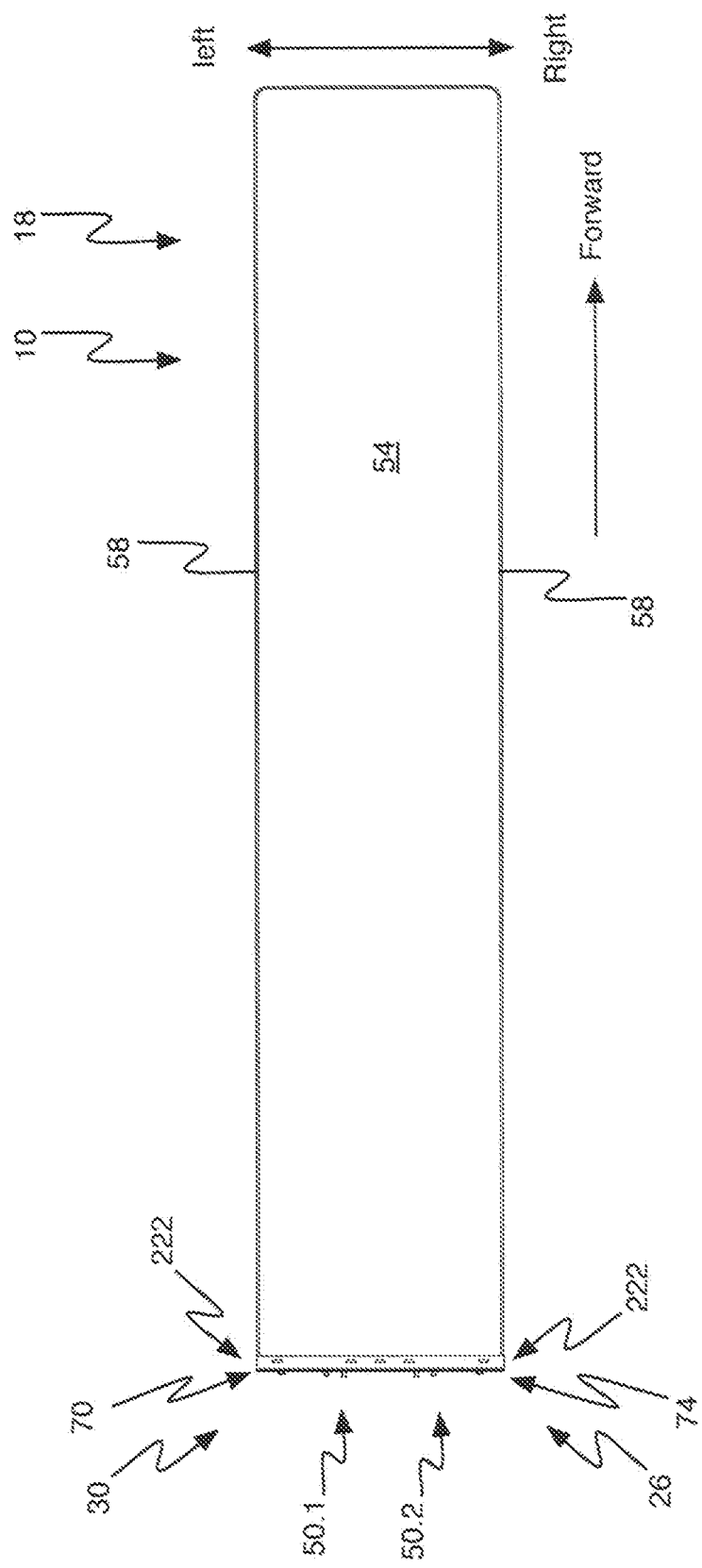
FIG. 7 is a top plan view of the trailer of FIG. 1, in accordance with at least one embodiment thereof.

A vehicle 10 including a tractor 14 and a trailer 18 is illustrated in FIG. 1. The tractor 14 is operatively connected to the trailer 18 to pull the trailer 18 in a forward direction. The tractor 14 and the trailer 18 are equipped with a series of wheels 22 to propel and support the vehicle 10 with optional cargo therein. The trailer 18 is equipped with a retractable aerodynamic air drag reducing apparatus 26 (hereinafter RAADRA 26) over a rear surface 20 of the trailer 18 as illustrated in its retracted configuration 30. The RAADRA 26 is deployable in an expanded configuration and retractable in a retracted configuration on a basis of specific vehicle 10 speeds, as it will be described in detail below. The RAADRA 26 includes a top panel 34 (of which a left top panel is identified 34.1 and a right top panel is identified 34.2, both are visible, inter alia, in FIG. 2), a pair of side panels 38 (of which a left side panel is identified 38.1 and a right side panel is identified 38.2, both are visible, inter alia, in FIG. 19), a back frame panel 42 and a bottom panel 46 of which a left bottom panel is identified 46.1 and a right bottom panel is identified 46.2, both are visible, inter alia, in FIG. 1). The top panel 34, the pair of side panels 38, the back frame panel 42 (of which a left back frame panel is identified 42.1 and a right back frame panel is identified 42.2, both are visible, inter alia, in FIG. 2) and the bottom panel 46 (of which a left bottom panel is identified 46.1 and a right bottom panel is identified 46.2, both are visible, inter alia, in FIG. 2) are connected by the back frame panel 42 and illustrated in its retracted configuration, as seen in FIG. 6 and FIG. 7, toward the rear surface of the trailer 18, over a pair of doors 50 of the trailer 18. The doors 50 are locked to the rear end of the trailer 18 with a door-locking mechanism 52 that is embodied in the present specification with standard pivotable vertical rods configured to engage the upper portion and the lower portion of the trailer 18. The trailer 18 includes a generally horizontal top roof portion 54, a pair of opposed generally vertical lateral wall portions 58 and a generally horizontal lower floor portion 62. A forward edge 36 of the top panel 34 is coincident with the top roof portion 54 and a forward edge 40 of the side panel 38 is coincident with the lateral wall portion 58 in at least one embodiment to efficiently channel air around the trailer 18. The back frame panel 42 of the depicted embodiment is illustratively of 256 centimeters by 122 centimeters (about 101 inches by 48 inches) in size. Other embodiments could use different dimensions, like about 76 centimeters (about 30 inches) in width. The height location of the bottom panel 46 of the depicted embodiment is illustratively of 203 centimeters up to 249 centimeters (about 80 inches up to 98 inches) relative to the top roof portion 54 of the trailer 18.

Figure 2:
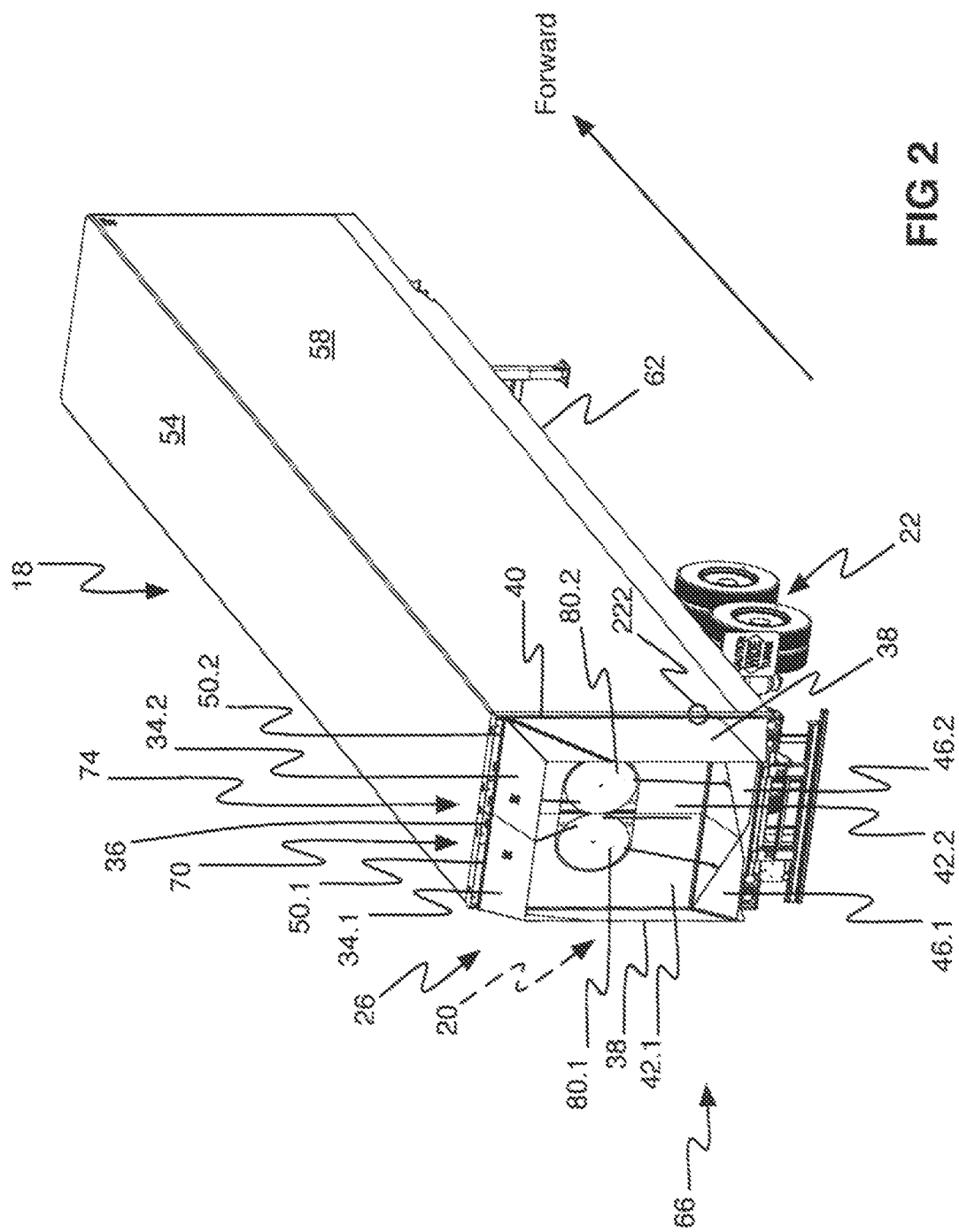
FIG. 2 is a rear-right perspective view of the trailer of FIG. 1, showing a retractable aerodynamic air drag reducing apparatus in an expanded aerodynamic configuration, in accordance with at least one embodiment thereof.
Figure 3:
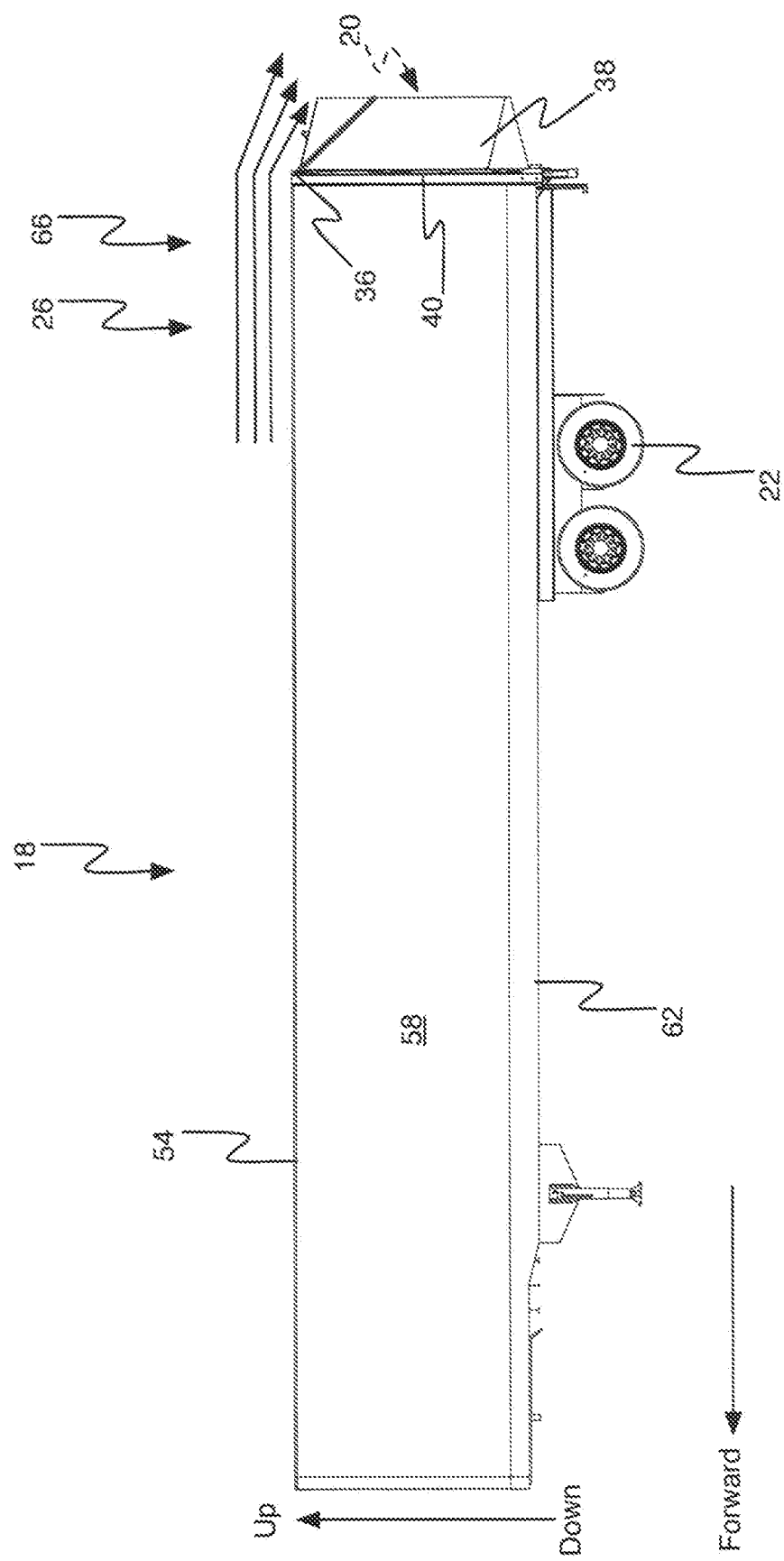
FIG. 3 is a left elevation view of the trailer of FIG. 1, in accordance with at least one embodiment thereof.
Figure 4:
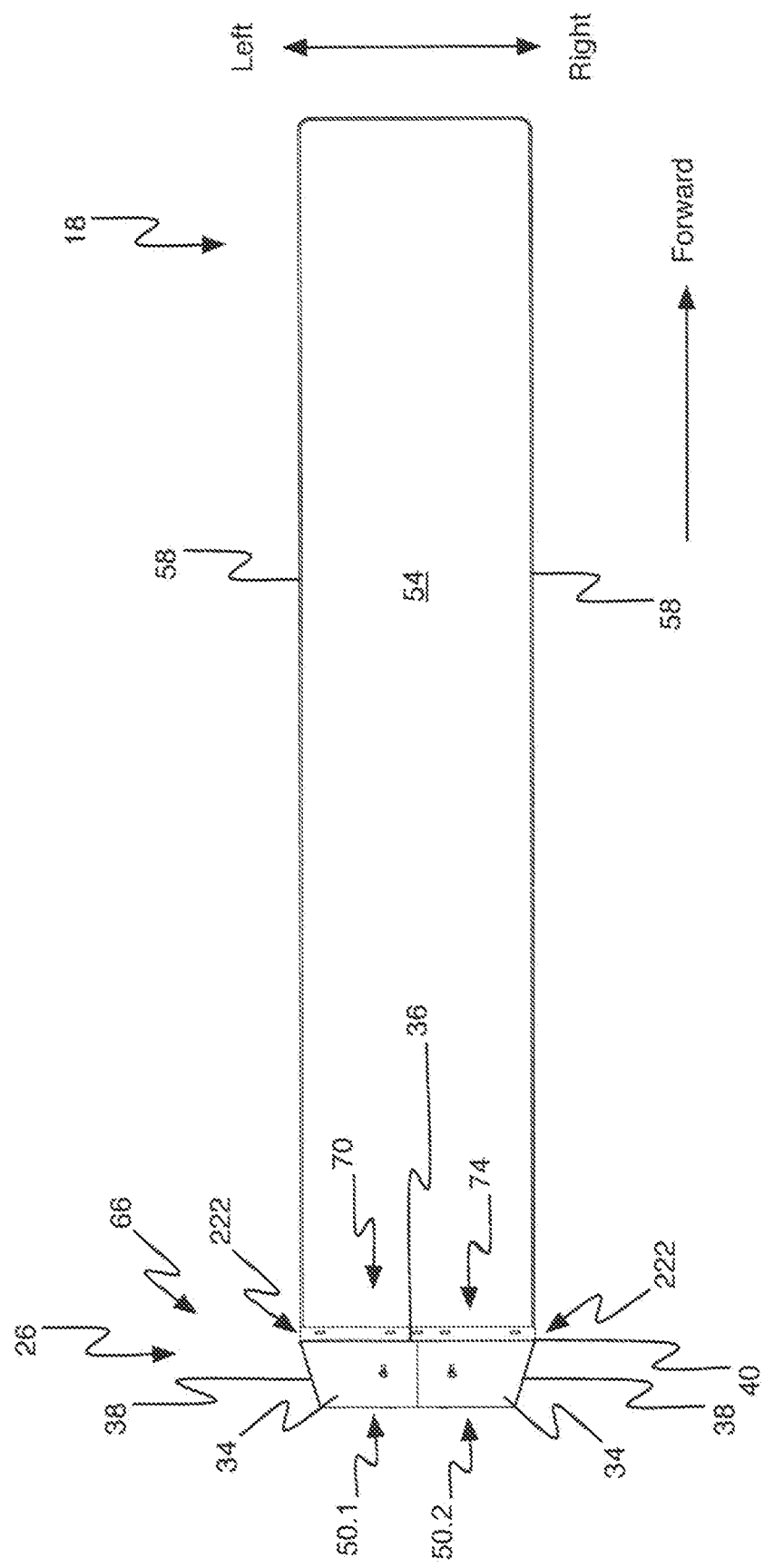
FIG. 4 is a top plan of the trailer of FIG. 1, in accordance with at least one embodiment thereof.
Figure 5:
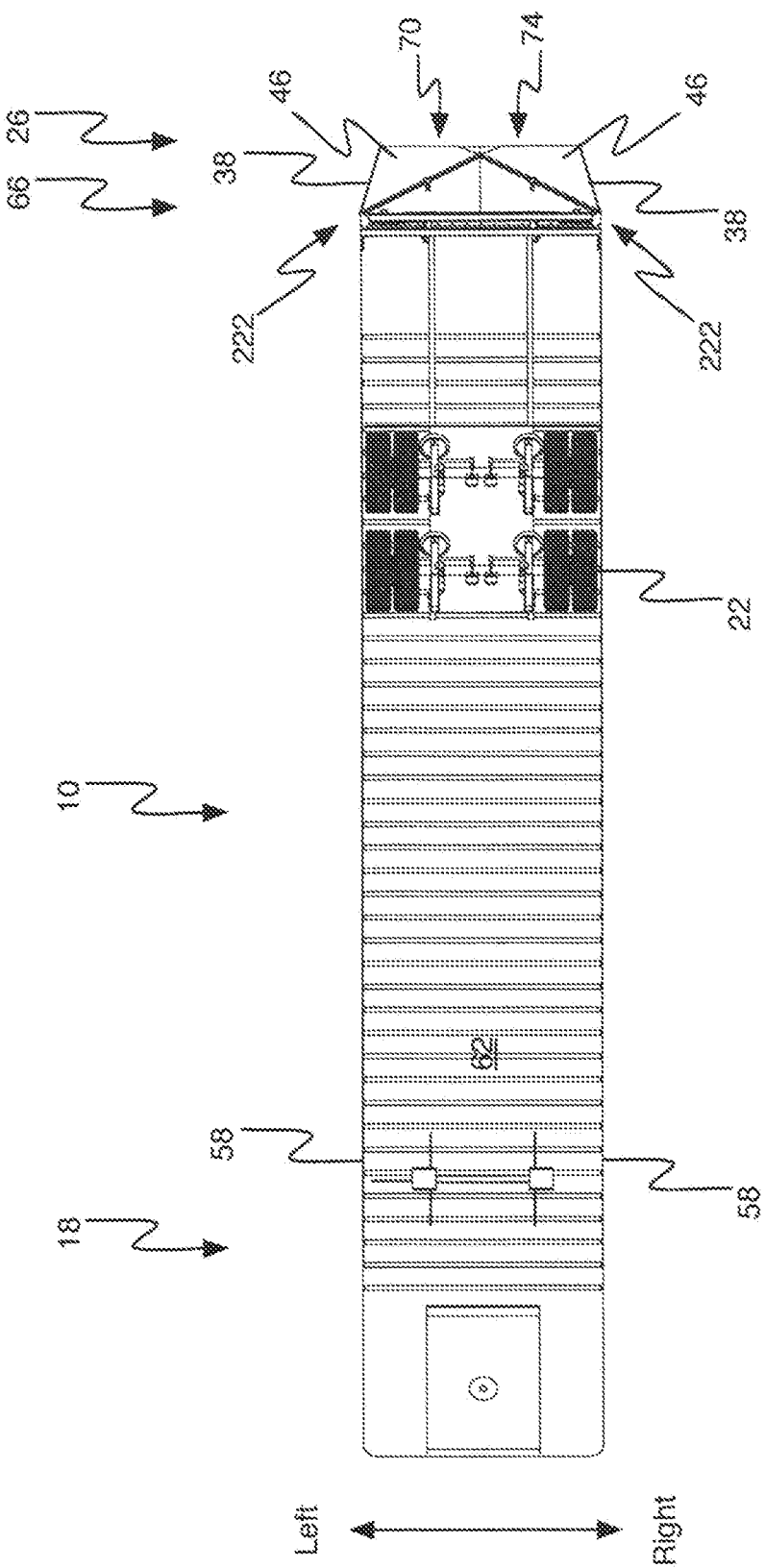
FIG. 5 is a bottom plan view of the trailer of FIG. 1, in accordance with at least one embodiment thereof.

FIG. 2 throughout FIG. 5 depict the RAADRA 26 installed on a trailer 18 in the expanded aerodynamic configuration 66. The expanded aerodynamic configuration 66 generally locates the top panel 34, the pair of side panels 38, the back frame panel 42 and the bottom panel 46 toward the rear of the trailer 18 to help route the flow of air around the rear portion of the trailer 18 to reduce the drag behind the trailer 18 when the trailer 18 moves in the forward direction.

It can be appreciated from the FIGS. 1, 2, 5, 6 and 7 that the RAADRA 26 is arranged in two halves, a left half 70 and a right half 74. The left half 70 is mounted with respect to a left-hinged door 50.1 and the right half 74 is mounted with respect to a right-hinged door 50.2. Each half 70, 74 are hingedly connected to the trailer 18 with hinges 76, preferably to respective door 50.1 and 50.2, as illustrated in FIG. 17, FIG. 17A, FIG. 18 and FIG. 18A. In a preferred embodiment, the back frame panel 42 of each half 70, 74 is secured on one side of the hinges 76 and the other side of the hinges 76 are connected to respective door 50.1, to allow a sway-away 350 movement of the RAADRA 26 in respect with the door 50.2 to allow independent movement of each half 70, 74. The sway-away 350 mechanism is used to be able to increase the gap between the door 50 and the trailer 18 side wall 38 in a door-opening configuration 358 when the door 50 has to be opened to allow enough room for the door 50 to open. Conversely, the sway-away mechanism 350 can be positioned in an aerodynamic configuration 362 to be able to reduce the gap between angle of the door 50 and the trailer 18 side wall 38, in an aerodynamic configuration 362, when the door 50 is closed, to increase the aerodynamic efficiency of the trailer 18. The sway-away 350 mechanism uses pivotal motion of the door-locking mechanism 52 generally actuated with lever handle 354 that is pivoting a first lever 378 connected thereto. The first lever 378 is operatively connected to a linkage 366 including a plurality of mechanical links 370, 374, 378 to pivot a first hinge 76.1. Pivotal of the first hinge 76.1 moves the back frame panel 42 between the door-opening configuration 358 and the aerodynamic configuration 362 with combine pivotal movement of the second hinge 76.2. The plurality of mechanical links 370, 374, 378 are providing an operative structure capable of actuating the movement of the RAADRA 26 about the door-locking mechanism 52. The length and the angles of the hinges 76.1, 76.2 can allow the back frame panel 42 to contact the door-locking mechanism 52 in the aerodynamic configuration 362 to prevent vibrations and rattles of the RAADRA 26 without requiring dampers or springs (not illustrated). The length and the angles of the hinges 76.1, 76.2 can also allow the back frame panel 42 to get close 374, or even touch, the rear corner 370 of the trailer 18 in the aerodynamic configuration 362 to optimize the flow of air around the trailer 18 and the RAADRA 26.

The embodied sway-away 350 structure is using hinges 76 that can be double hinges 76, however, other sway away 350 mechanisms that could allow relative pivotal of the RAADRA 26 in respect with the door 50 and pivotal movement of the door 50 in respect with the trailer 18 are contemplated by the present description. The hinges 76 are providing the distancing movement from the hinges of the door 50 required by the RAADRA 26 to allow the doors 50 of the trailer 18 to open. The distancing movement is necessary in order to allow the doors 50 to open up to 270 degrees toward respective lateral wall portions 58 of the trailer 18, or to allow complete opening of the doors 50, without interferences with the side wall 38. The RAADRA 26 will be located generally flat against the side panels 38 of the trailer 18 when the doors 50 of the trailer 18 are in the open position to allow access to the interior space of the trailer 18 and dock the trailer 18 to unload cargo transported therein.

Figure 8:
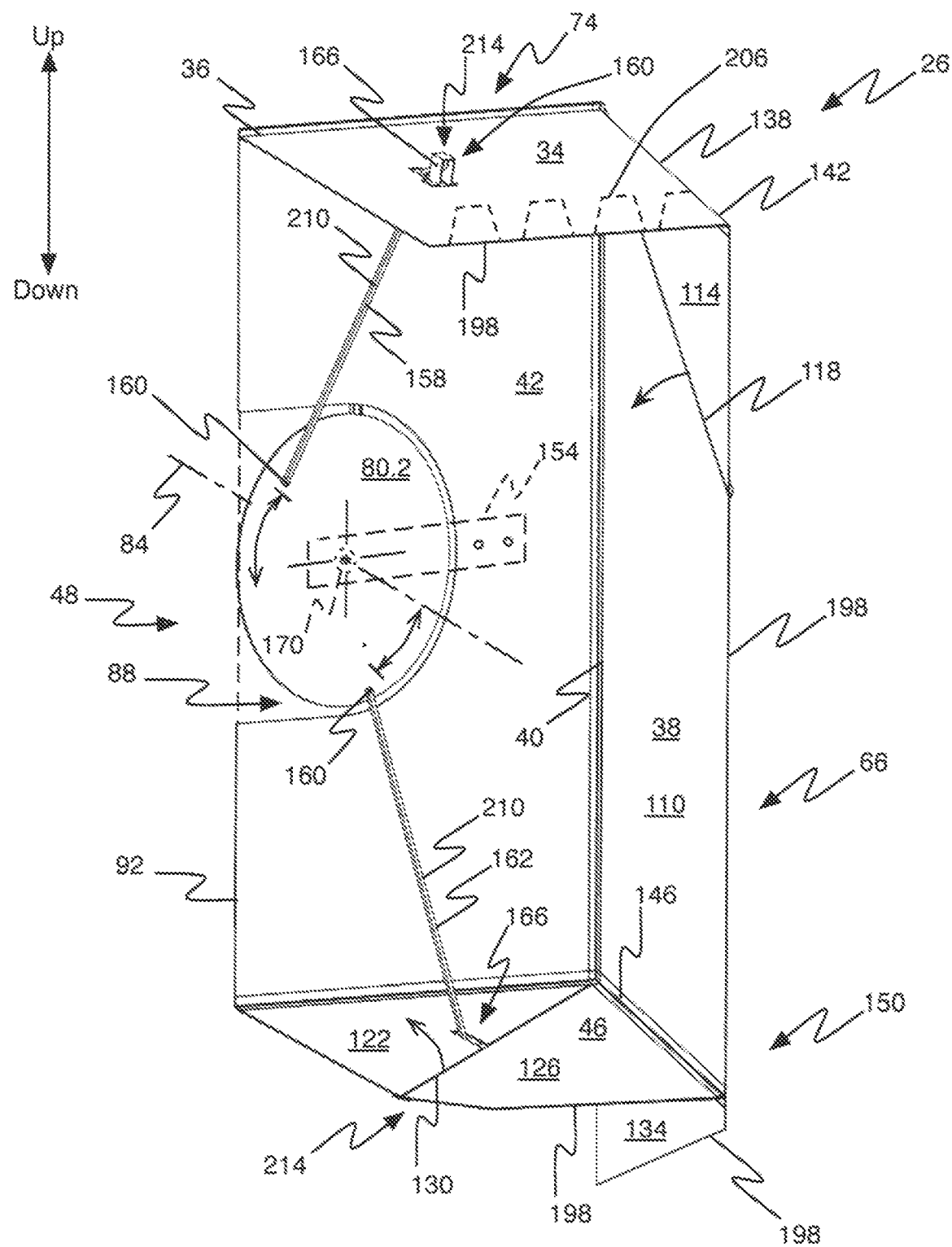
FIG. 8 is a magnified rear-left perspective view of the retractable aerodynamic air drag reducing apparatus of FIG. 1 in the expanded configuration, in accordance with at least one embodiment thereof.
Figure 11:
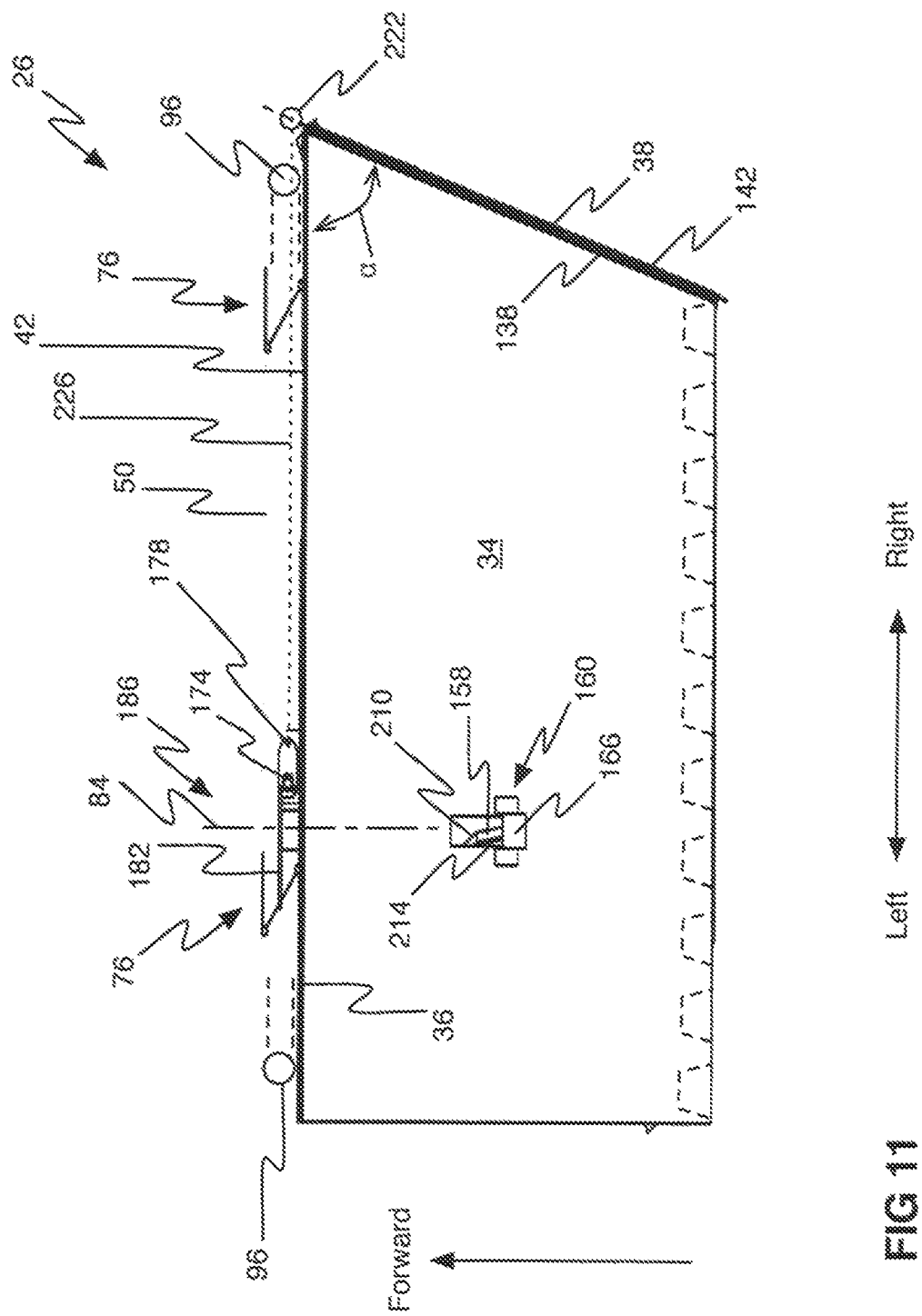
FIG. 11 is a top plan view of the retractable aerodynamic air drag reducing apparatus of FIG. 1 in the expanded configuration, in accordance with at least one embodiment thereof.
Figure 12:
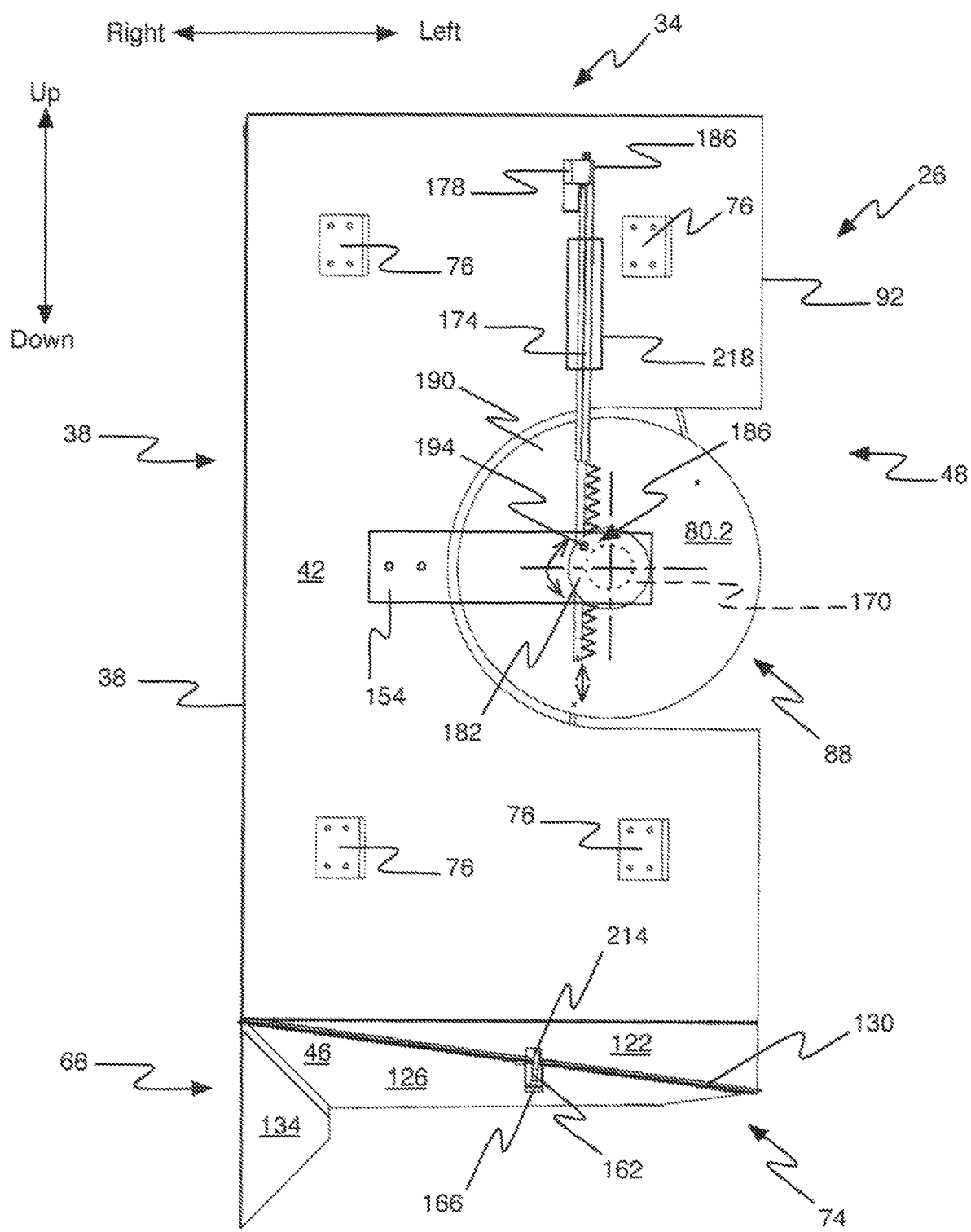
FIG. 12 is a front elevation view of a magnified portion of the retractable aerodynamic air drag reducing apparatus of FIG. 1 in the expanded configuration, in accordance with at least one embodiment thereof.
Figure 13:
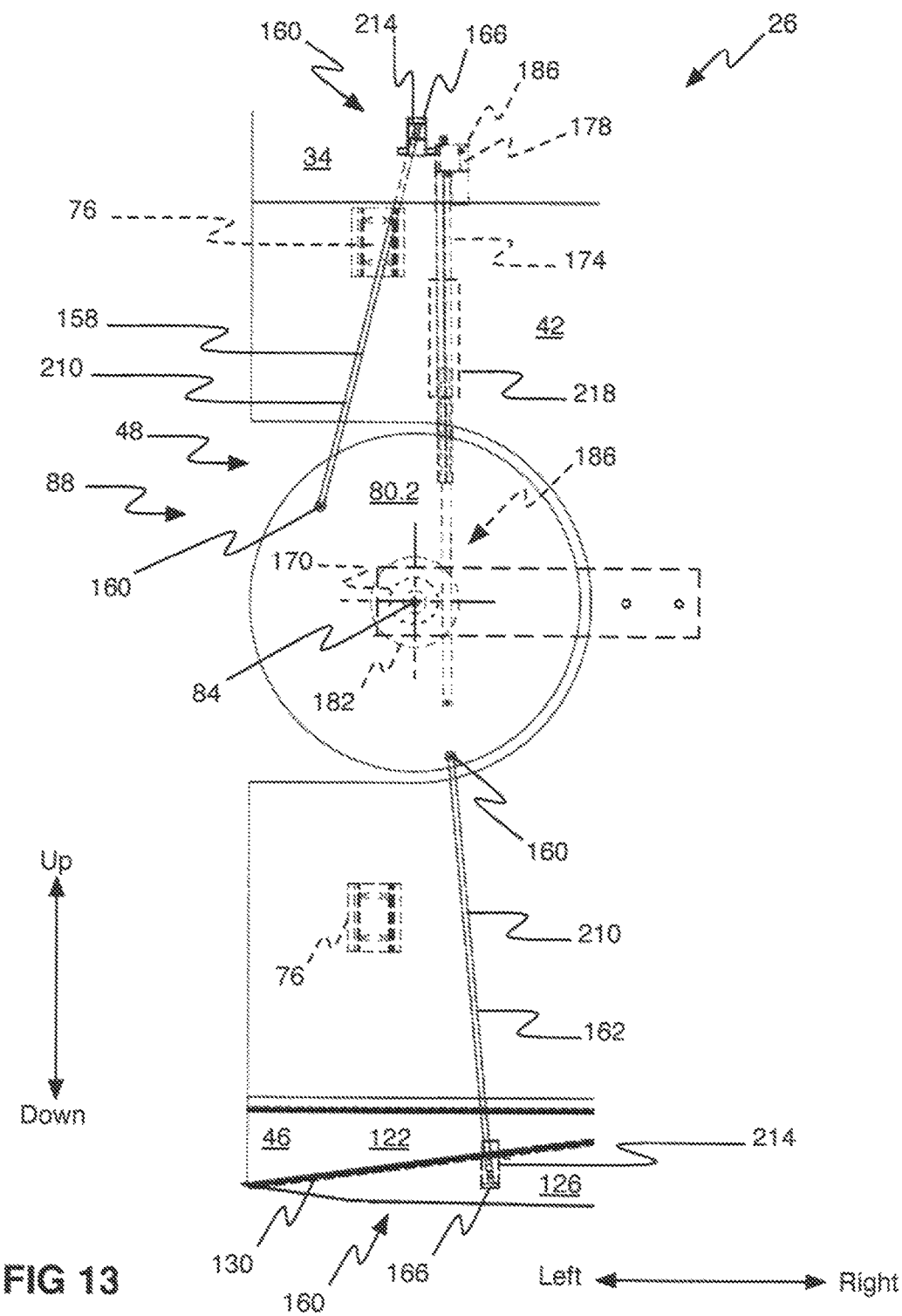
FIG. 13 is a rear elevation view of a magnified portion of the retractable aerodynamic air drag reducing apparatus of FIG. 1 in the expanded configuration, in accordance with at least one embodiment thereof.

FIG. 8 throughout FIG. 11 are illustrating that each side panel 38 is hingedly connected to respective back frame panel 42. Each top panel 34 is hingedly connected to respective back frame panel 42 and, secondly, pivotably secured to corresponding side panel 38. Each bottom panel 46 are pivotally secured to respective back-frame panel 42 and, secondly, pivotably secured to corresponding side panel 38. The interconnections between the panels allow unified movements thereof when changing the RAADRA 26 between the expanded configuration and the retracted configuration with an actuation mechanism 48. The embodied back frame panels 42 are generally rectangular, however, the shape of the back frame panel 42 could alternatively be of a different shape, like triangular or trapezoidal, or any other shape that is adapted to offer the required connection points for securing the back frame panel 42 and the other components thereon. Alternatively, the back frame panel 42 can be an assembly of various parts to provide the required mechanical strength. A gasket, or a seal 96, as schematically illustrated in FIG. 11, can be secured around a periphery of the back frame panel 42, between the door 50 of the trailer 18 and the RAADRA 26, to prevent dirt and snow to get therebetween to limit the air passage between the trailer 18 doors 50 and the RAADRA 26 and also to help reduce vibrations and possible rattles of the assembly.

Still referring to FIGS. 1, 2, 5, 6 and 7, the side panel 38, the top panel 34 and the bottom panel 46 of each half 70, 74 are independently or collectively actuated by a pivotable member 80 (of which a left pivotable member is identified 80.1 and a right pivotable member is identified 80.2, both are visible, inter alia, in FIG. 1) that is pivotably secured to the back frame panel 42, in the present embodiment, and further adapted to pivot about a pivot axis 84 thereof. A cut-out portion 88 is creating an opening in the back frame panel 42 used in the illustrated embodiment to receive the pivotable member 80 flush with the surface of the back frame panel 42 to minimize the assembly's thickness. The thickness of the assembly is limited since the RAADRA 26 assembly, in its retracted configuration, needs to fit between the door 50 of the trailer 18 and the side panel 38 of the trailer 18 when the door 50 of the trailer 18 is open to access the trailer's cargo space. The pivotable member 80 can alternatively be located over the back frame panel 42 without departing from the present invention. The pivotable member 80 is also embodied with a circular shape to minimize the opening in the back frame panel 42 for pivoting the pivotable member 80. Moreover, without disclaimer of other effective locations, the pivotable member 80 of the illustrated embodiment is tangent to the proximal free edge 92 of the back frame panel 42 as best seen in FIG. 8. Materials such as thermoplastic, aluminum or other suitable materials can be used for manufacturing the panels 34, 38, 42, 46 and the pivotal member 80.

Still referring to FIG. 8, illustrating a second half 74 of the RAADRA 26, where one can appreciate the side panel 38 is made of two components, a main panel portion 110 and a secondary panel portion 114 hingedly interconnected with a hinge 118 or any means producing similar results. The main panel portion 110 and the secondary panel portion 114 are adapted to fold when the RAADRA 26 is moving from the expanded aerodynamic configuration 66 to the retracted configuration 30. The main panel portion 110 touches the back frame panel 42 in the retracted configuration 30 illustrated in the embodiment. The bottom panel 46 is similarly designed and includes a main bottom portion 122 and a secondary bottom portion 126 hingedly interconnected with a hinge 130 or any means producing similar results. The main bottom portion 122 and the secondary bottom portion 126 are adapted to fold when the RAADRA 26 is moving from the expanded aerodynamic configuration 66 to the retracted configuration 30. The top panel 34 includes a distal edge 138 that is pivotably interconnected with an upper edge 142 of the side panel 38. Similarly, the bottom panel 46 includes a distal edge 146 pivotably interconnected with a low section 150 of the side panel 38. In the present embodiment, the side panel 38 extends furthermore than the interconnection location of the bottom panel 46 with a low portion 134 to improve the flow of air around the vehicle 10. This is an exemplary RAADRA 26 folding structure 28 and other alternate folding structures 28 performing similar functions are equally contemplated in the present specification; some of them are discussed below in respect with FIG. 19 throughout FIG. 25.

The pivotable member 80 is pivotably connected to a support member 154 that is schematically embodied behind the back frame panel 42 in FIG. 8. A bearing member 170 is pivotally securing the pivotable member 80 in respect with back frame panel 42. The pivotable member 80 is interconnected to the top panel 34 with a first rod 158 via a connector providing the required amount of motion like a ball joint 160 while it is connected to the bottom panel 46 with a second rod 162. Each rod 158, 162 is connected to respective panel 34, 46 with a bracket 166, that could use a ball joint 160 connection allowing multiple degrees of freedom—three degrees of freedom can be sufficient in many scenarios although a bearing member could work in some other scenarios—to adapt to the movements of the RAADRA 26, and are used to actuate and angularly locate the panels 34, 46. The brackets 166 are extending through their respective panel 34, 46 to minimize the thickness of the assembly when the RAADRA 26 is in the retracted configuration 30. A typical length of the rods 158, 162 could be up to about 127 centimeters (about 50 inches). Additionally, the rods 158, 162 include a first section 210 thereof and a second section thereof 214, the former being substantially straight and the latter being at an angle from the first section 210 to create a rod geometry capable of producing a substantially flat and compact RAADRA 26 when in the retracted configuration 30. The second section 214 of the rods 158, 162 provide the initial leverage to open the top panel 34 or the bottom panel 46 when the RAADRA 26 is in the retracted configuration 30. The angle between the first section 210 and the second section 214 could vary from 20 degrees to 80 degrees.

Figure 9:
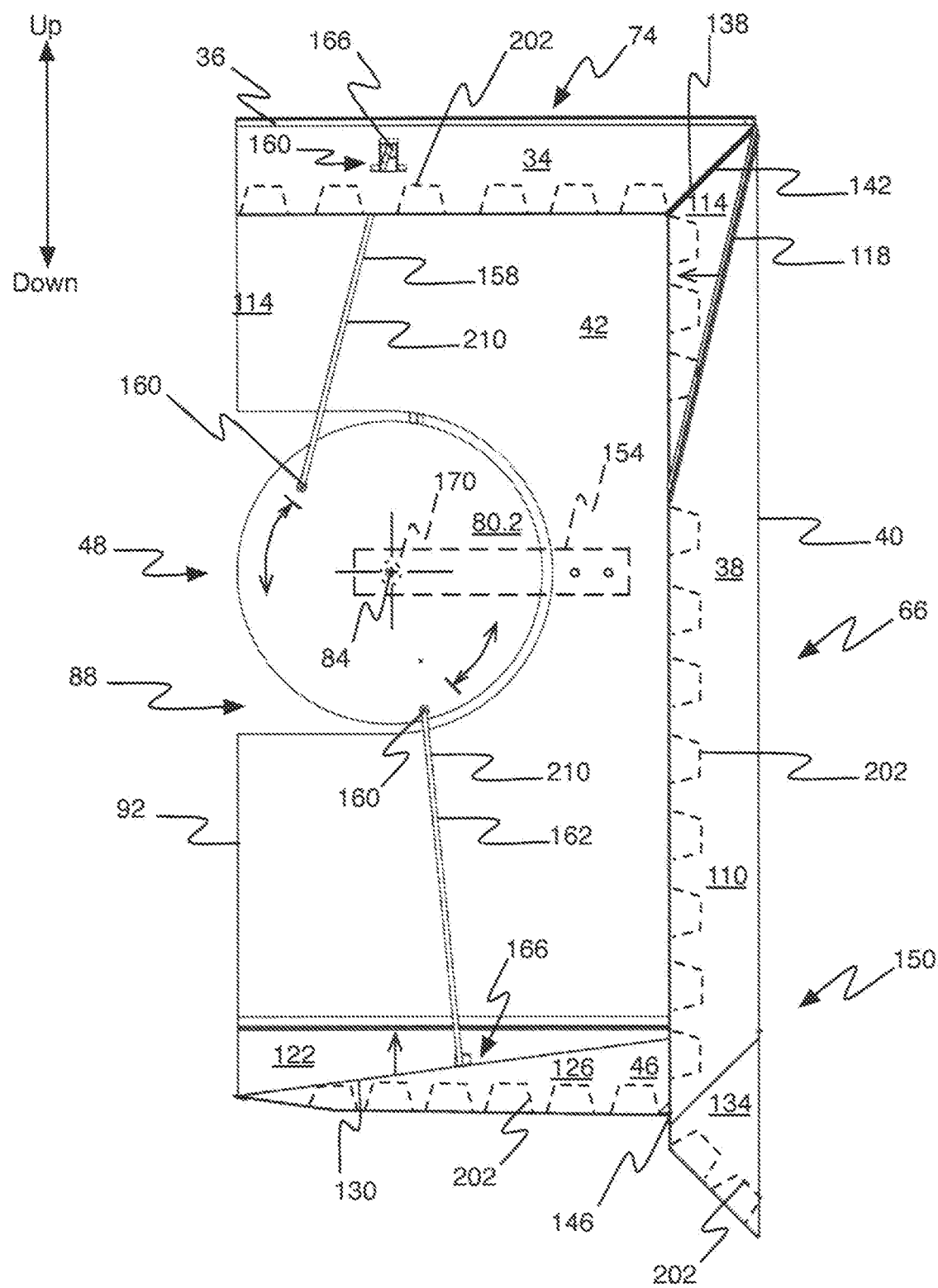
FIG. 9 is a magnified rear elevation view of the retractable aerodynamic air drag reducing apparatus of FIG. 1 in the expanded configuration, in accordance with at least one embodiment thereof.
Figure 10:
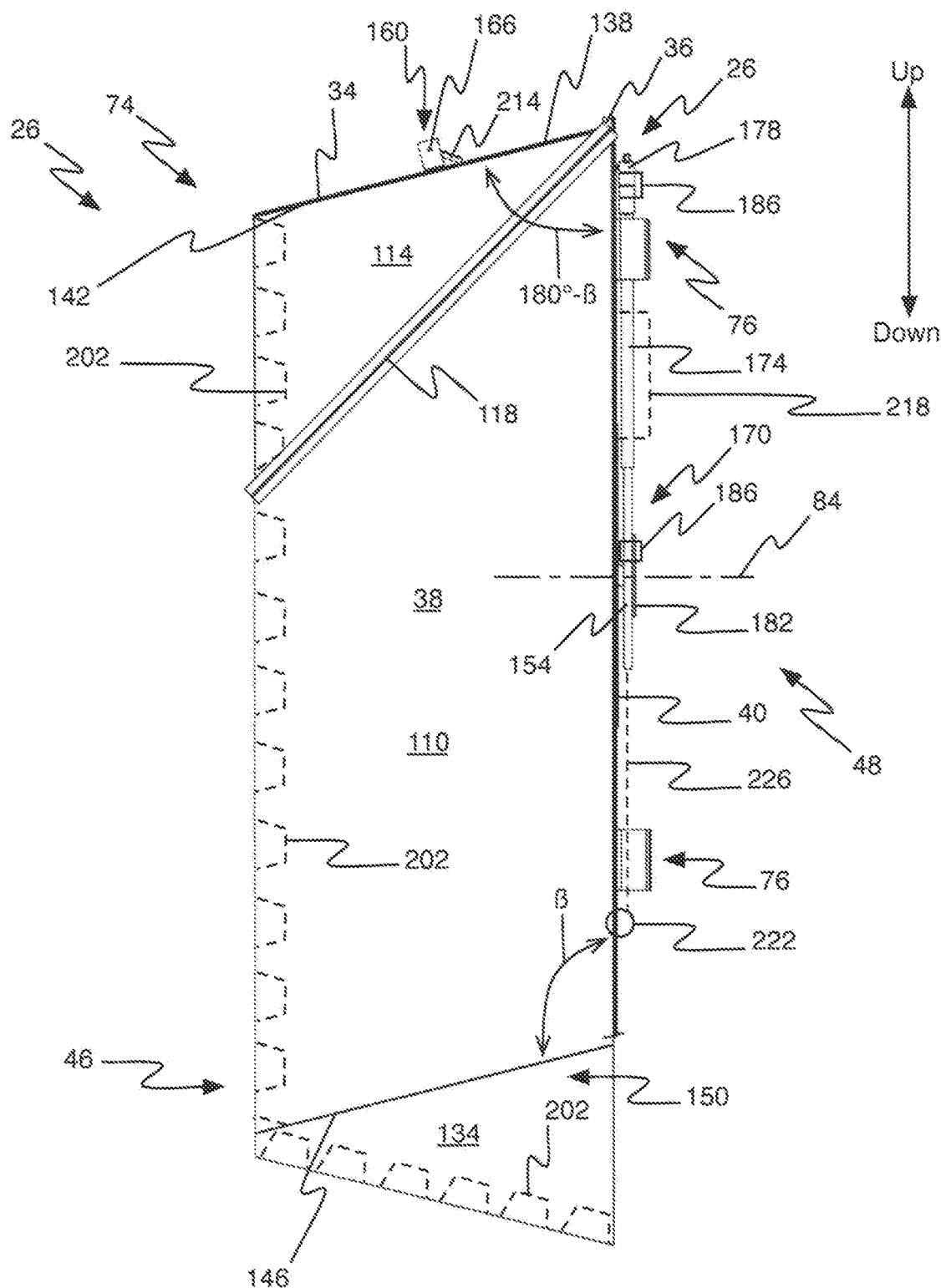
FIG. 10 is a magnified left elevation view of the retractable aerodynamic air drag reducing apparatus of FIG. 1 in the expanded configuration, in accordance with at least one embodiment thereof.

The RAADRA 26 of the present invention can be embodied with a straight trailing edge 198 as illustrated in FIG. 8, a serrated trailing edge 202 as illustrated in FIG. 9 and FIG. 10, a chevron-like trailing edge 206, or a jagged trailing edge 206 as illustrated in FIG. 11. The various types of trailing edges 198, 202, 206 can be used individually or collectively on a same RAADRA 26.

The angle α between the side panel 38 and the back frame panel 42 is illustratively of about 76 degrees. The angle within the scope of the present invention can extend to about between 70 degrees and 80 degrees in another unillustrated embodiment. Of about between 65 degrees and 85 degrees in one other unillustrated embodiment. The angle β between the bottom panel 46 and the back frame panel 42 is illustratively of about 104 degrees. The angle within the scope of the present invention can extend to about between 100 degrees and 110 degrees in another unillustrated embodiment. Of about between 95 degrees and 115 degrees in one other unillustrated embodiment. In at least one embodiment, the top panel 34 and the bottom panel 46 are disposed at similar angle β with the back frame panel 42. All these angles are considered to be within the scope of the present application.

Figure 14:
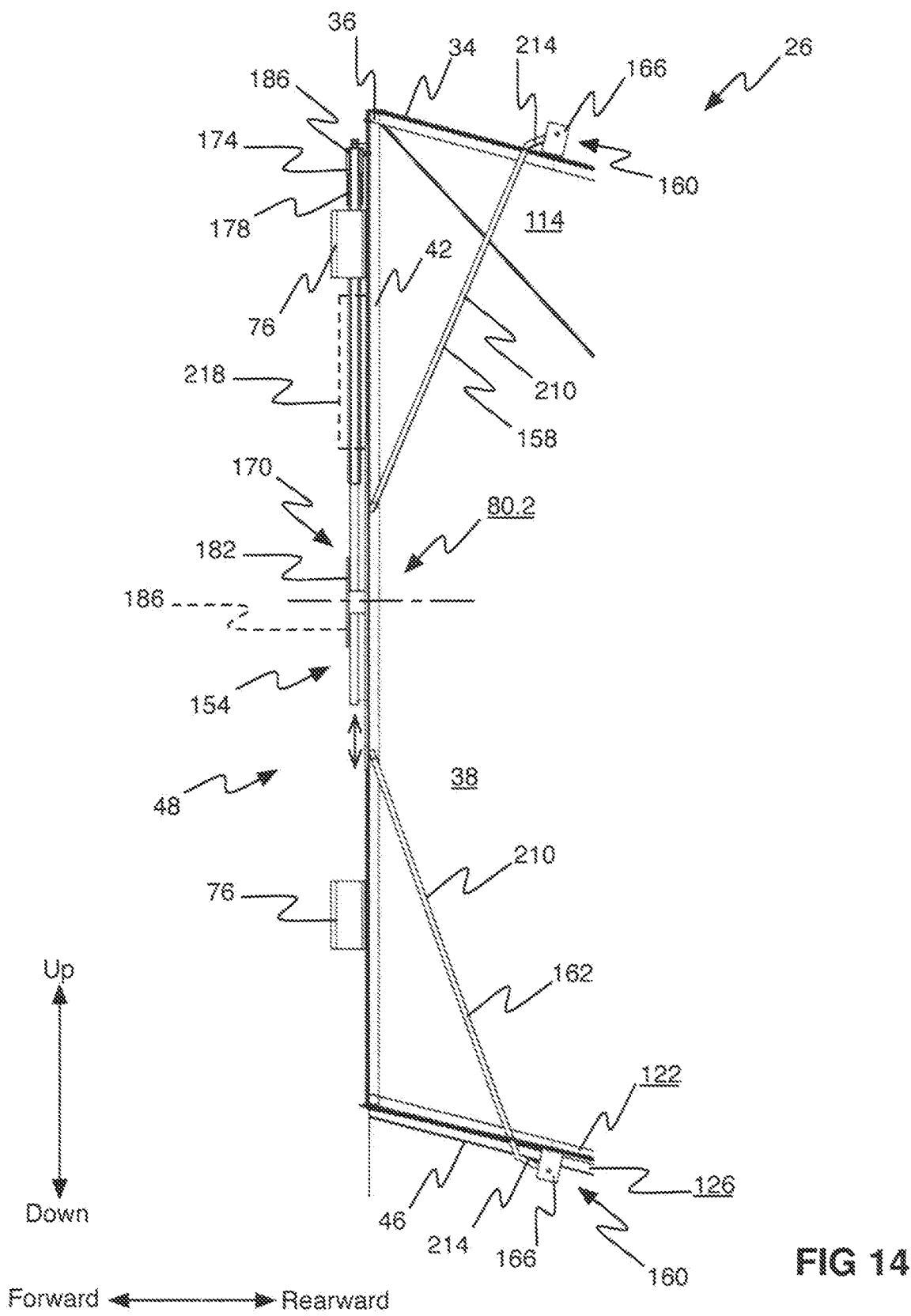
FIG. 14 is a right-side elevation view of a magnified portion of the retractable aerodynamic air drag reducing apparatus of FIG. 1 in the expanded configuration, in accordance with at least one embodiment thereof.
Figure 15:
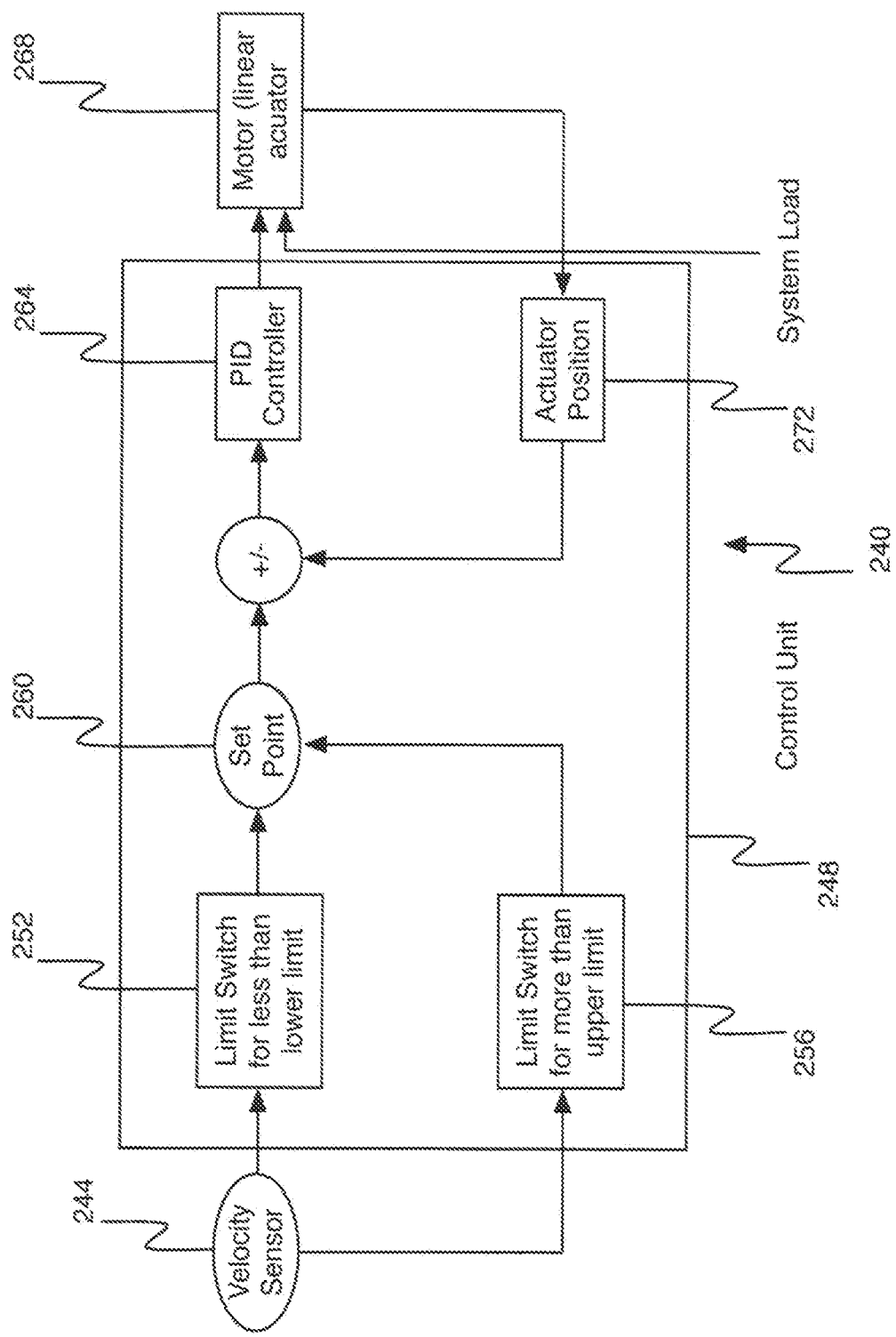
FIG. 15 is an exemplary bloc diagram of an exemplary retractable aerodynamic air drag reducing apparatus management system, in accordance with at least one embodiment thereof.

Referring now to FIG. 10 throughout FIG. 14, one can appreciate the pivotable member 80 of each half 70, 74 of the RAADRA 26 is actuated by an actuator 174 to move the RAADRA 26 between the expanded aerodynamic configuration 66 and the retracted configuration 30. One actuator 174 is used to actuate the first half 70 of the RAADRA 26 and another actuator 174 is used to actuate the second half 74 of the RAADRA 26. The embodiment is using an electrical actuator 174 that is vertically affixed to the forward side of the back frame panel 42. The actuator 174 is managed by a system capable of actuating the actuator 174 on a basis of several controlling vehicle's 10 behaviors, like speed, travel directions (forward, reverse) and other exterior consideration like the temperature and the amount of traffic on the road next to the vehicle 10. The actuator 174 of the illustrated embodiment is connected to the back frame panel 42 with a bracket 178 and can be operatively secured to the pivotal member 80 via an actuator lever 182 with a rack and pinion mechanism 190. Alternatively, the actuator 174 can be secured with a fastener 194 to the pivotal member 80. The pair of actuators 174 can be managed individually or collectively as it will be described below. Each actuator 174 can optionally be equipped with a quick disconnect mechanism 186 that can be manually actuated to selectively engage/disengage one end of the actuator 174 from either the back frame panel 42 or the pivotable member 80 for manually operating the RAADRA 26 between the retracted configuration 30 and the expanded configuration 66 if, for example, the actuator 174 cannot be normally actuated. In so doing, the actuator 174 can be secured along a rail 218 for allowing a controlled longitudinal movement of the actuator 174 when disengaged and moving between the retracted configuration 30 and the expanded configuration 66. The quick disconnect mechanism 186 can be actuated from an easy actuating location 222 on the RAADRA 26, or on the trailer 18, that is easy to access irrespective of whether the RAADRA 26 is in the retracted configuration 30 or the expanded configuration 66. A push-pull cable 226 or other appropriate linkage can be used to reach the easy actuating location 222.

Figure 16:
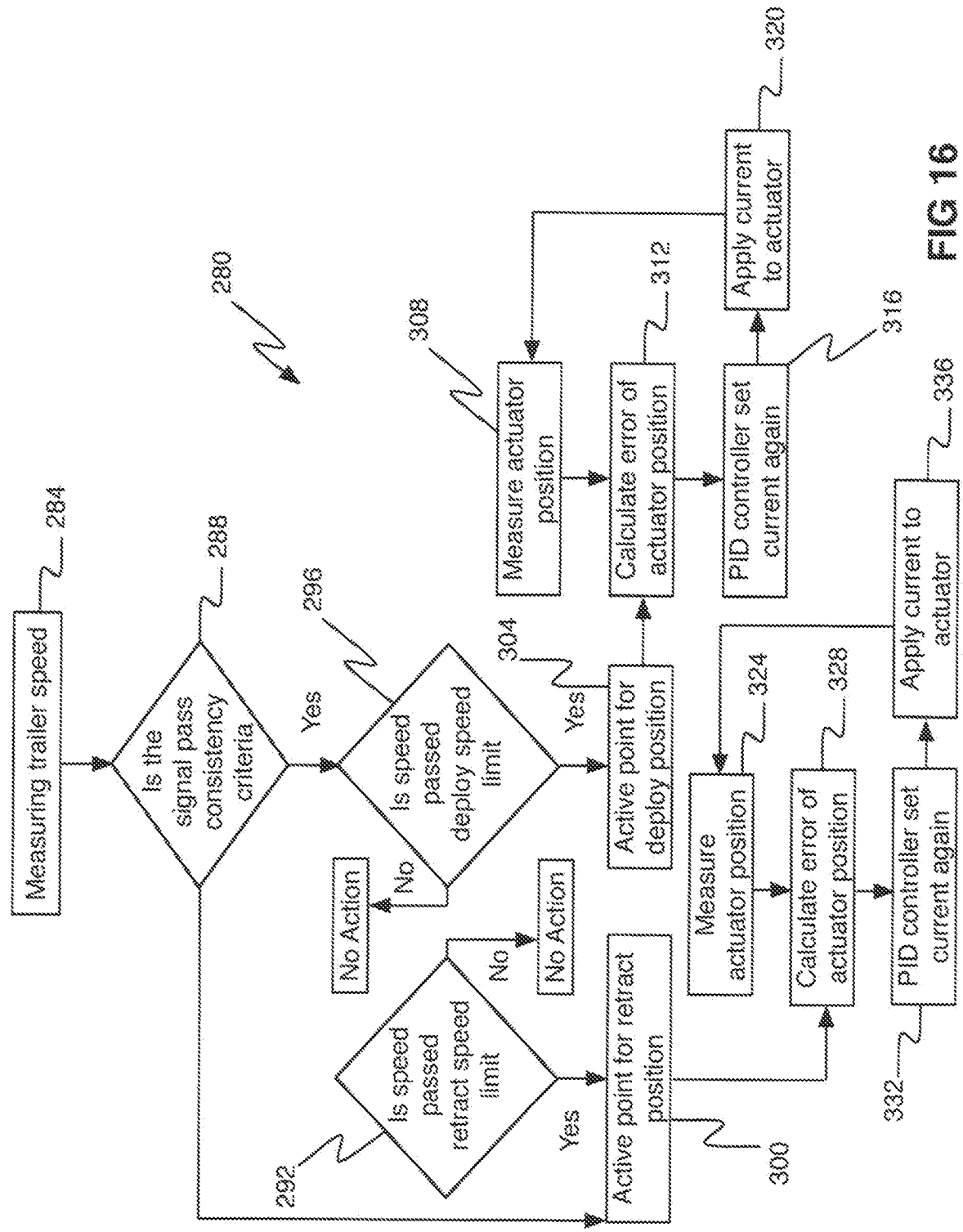
FIG. 16 is an exemplary flow chart of an exemplary retractable aerodynamic air drag reducing apparatus management system, in accordance with at least one embodiment thereof.
Figure 17:
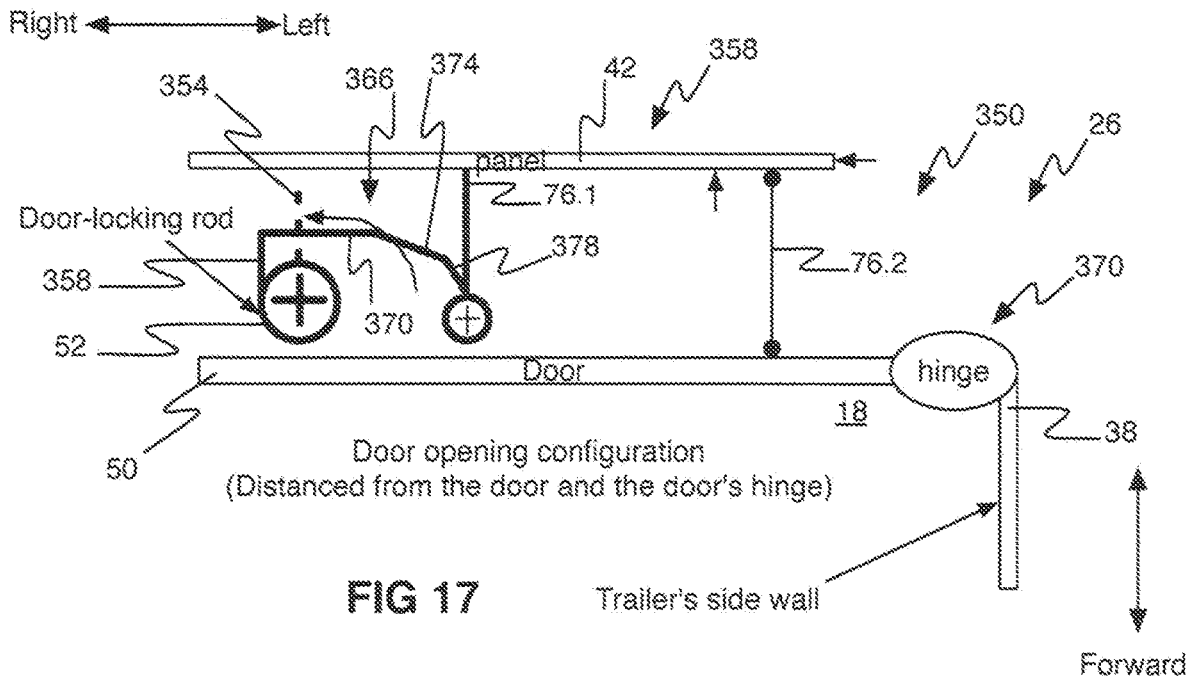
FIG. 17 is a top plan view of an exemplary sway-away mechanism for actuating the retractable aerodynamic air drag reducing apparatus, in a door-opening configuration, in accordance with at least one embodiment thereof.
Figure 18:
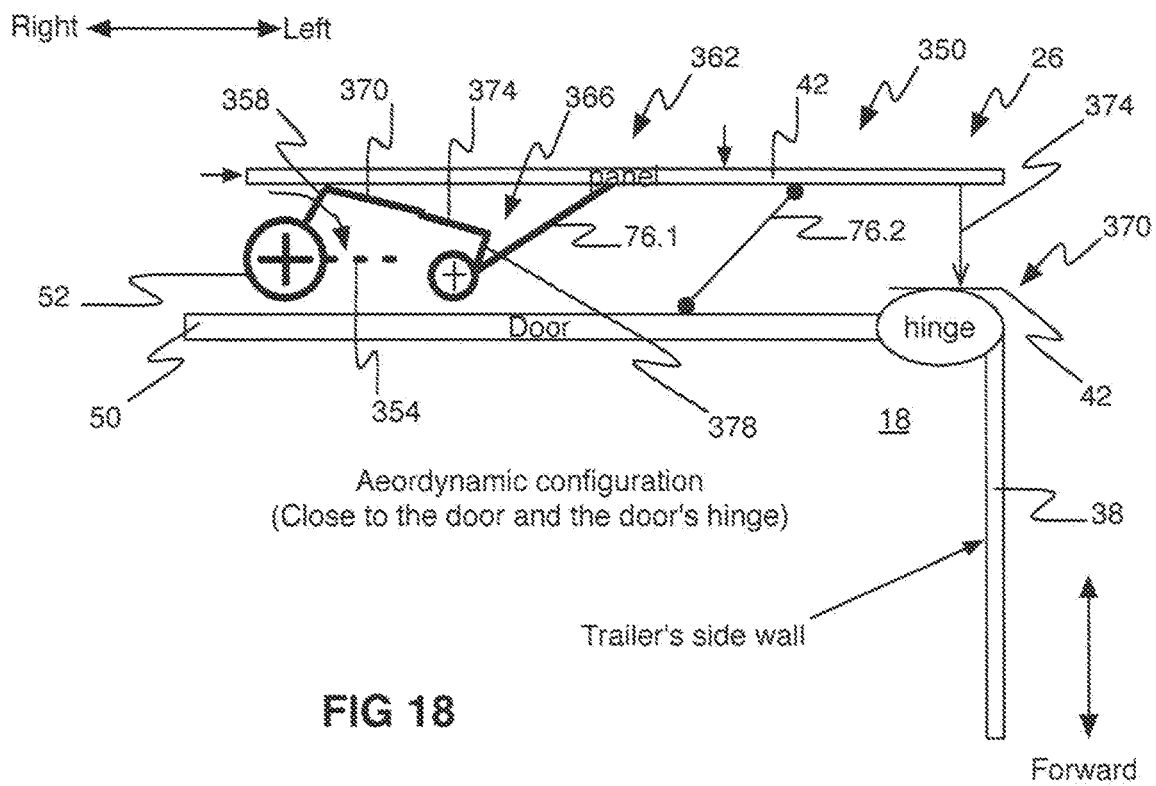
FIG. 18 is a top plan view of an exemplary sway-away mechanism for actuating the retractable aerodynamic air drag reducing apparatus, in an aerodynamic configuration, in accordance with at least one embodiment thereof.

The RAADRA 26 is managed by a control system 240 that comprises, for example, a velocity sensor 244, that is communicating with a control unit 248. A lower speed limit switch 252 and an upper speed limit switch 256 in the control unit 248 are reacting to the velocity sensor 244 input to keep the RAADRA 26 within a predetermined set point 260 like target vehicle speeds. The control unit 248 includes a PID controller 264 that is operatively connected to the set point 260 to actuate 268 the actuators 174. Actuators position sensors 272 are verifying the position of the RAADRA 26 and send a signal to the control unit 248 for further actions, if required. FIG. 16 depicts a typical flow chart 280 illustrating a possible management logic of the RAADRA 26. As illustrated, the exemplary process begins with measuring the trailer speed 284 and evaluating if the signal passes the consistency criteria 288. If no, active point for retract position 300 and if yes, is the speed passed deploy position 296? If no, there is no action and conversely, if yes, active point for deploy position 304, then calculate error of actuator position 312 that is leading to PID controller set current again 316, apply current to actuator 320 and after measure actuator position 308. Is speed passed retract limit 292 is no: no action, in contrast, if yes: active point for retract position 300, then calculate error of actuator position 328, then PID controller set current again 332 and apply current to actuator 336 to get to measure actuator position 324.

Figure 19:
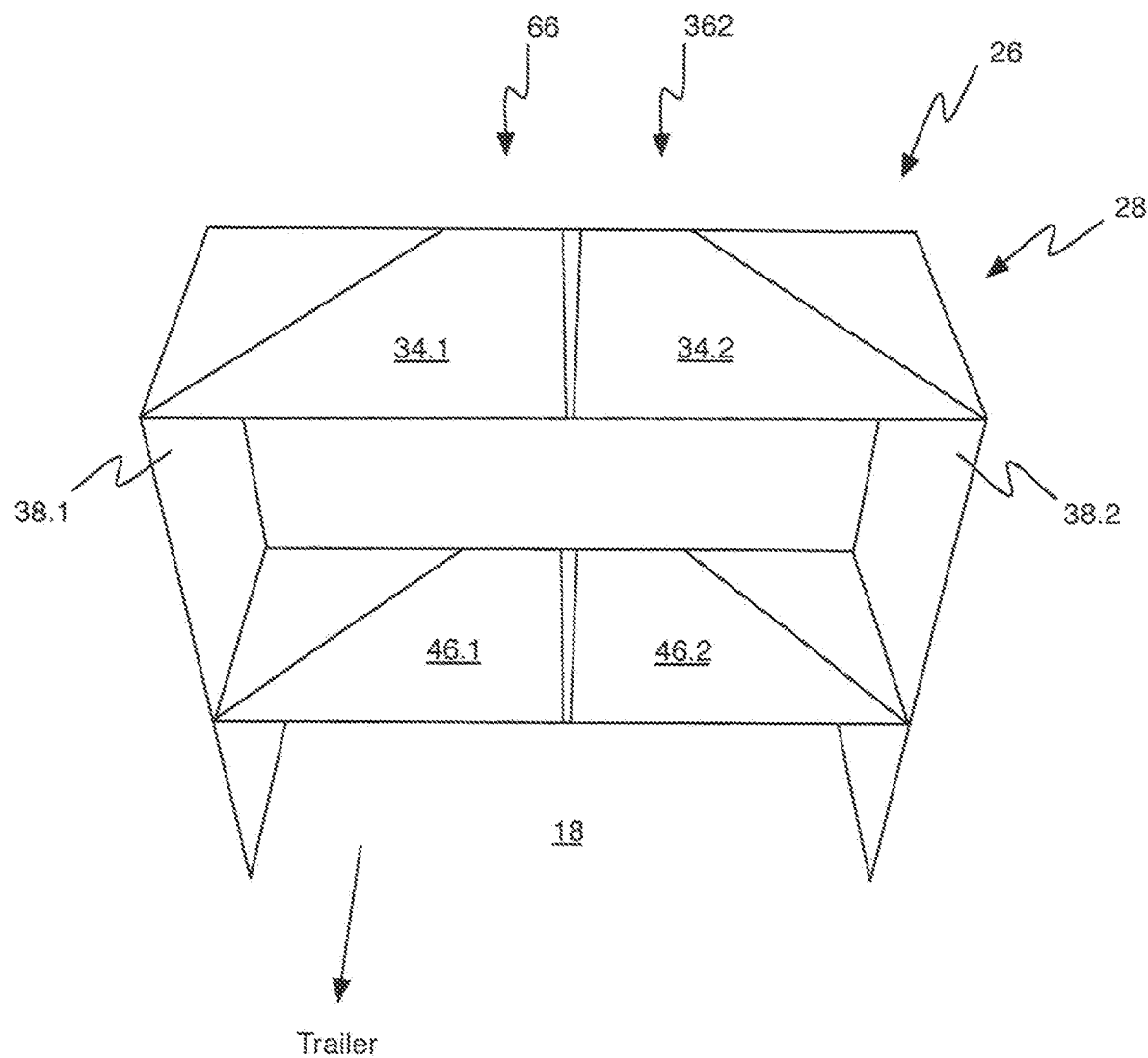
FIG. 19 is a front perspective view of an alternate folding structure, in accordance with at least one embodiment thereof.
Figure 20:
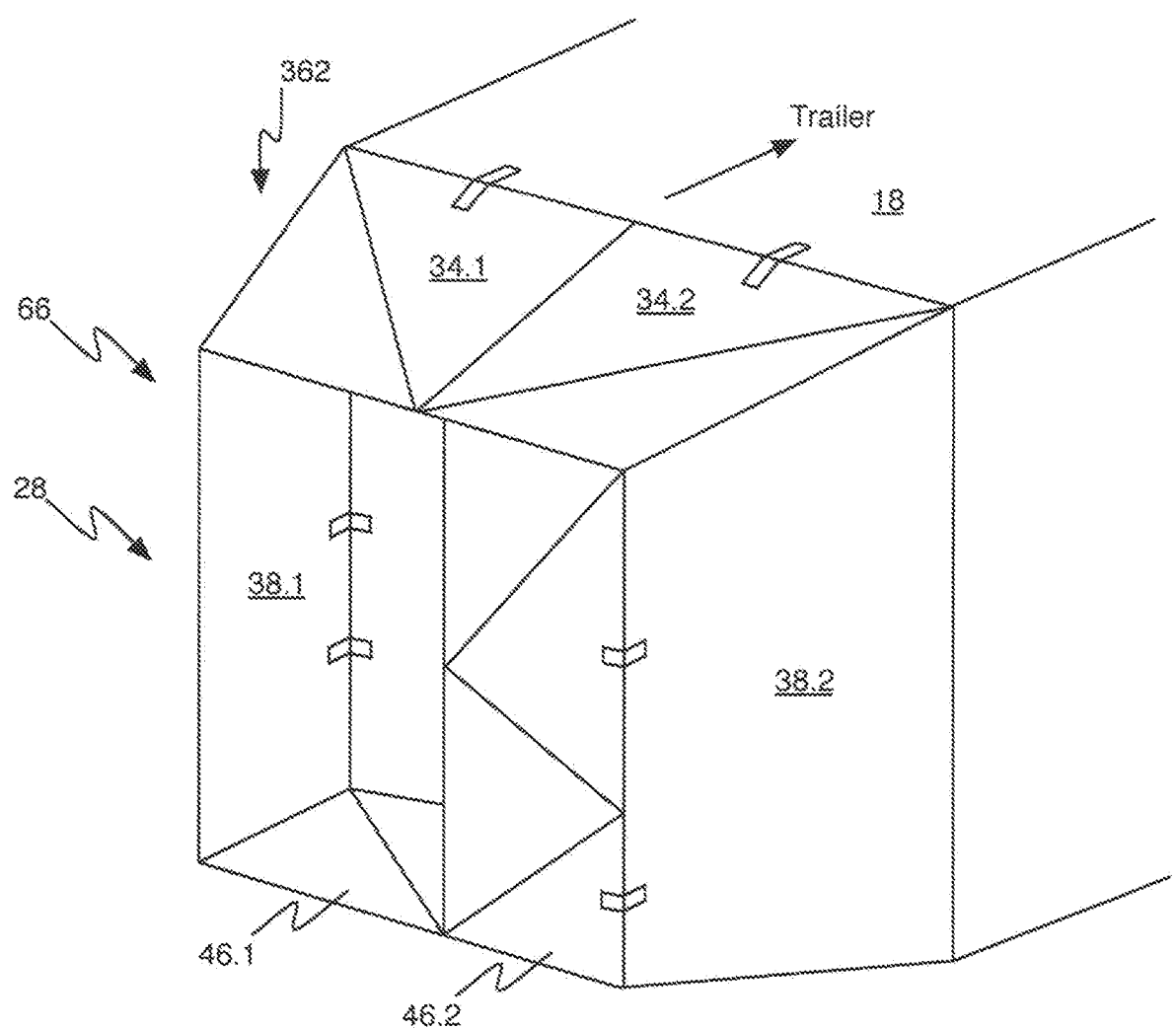
FIG. 20 is a rear-right perspective view of an alternate folding structure, in accordance with at least one embodiment thereof.
Figure 21:
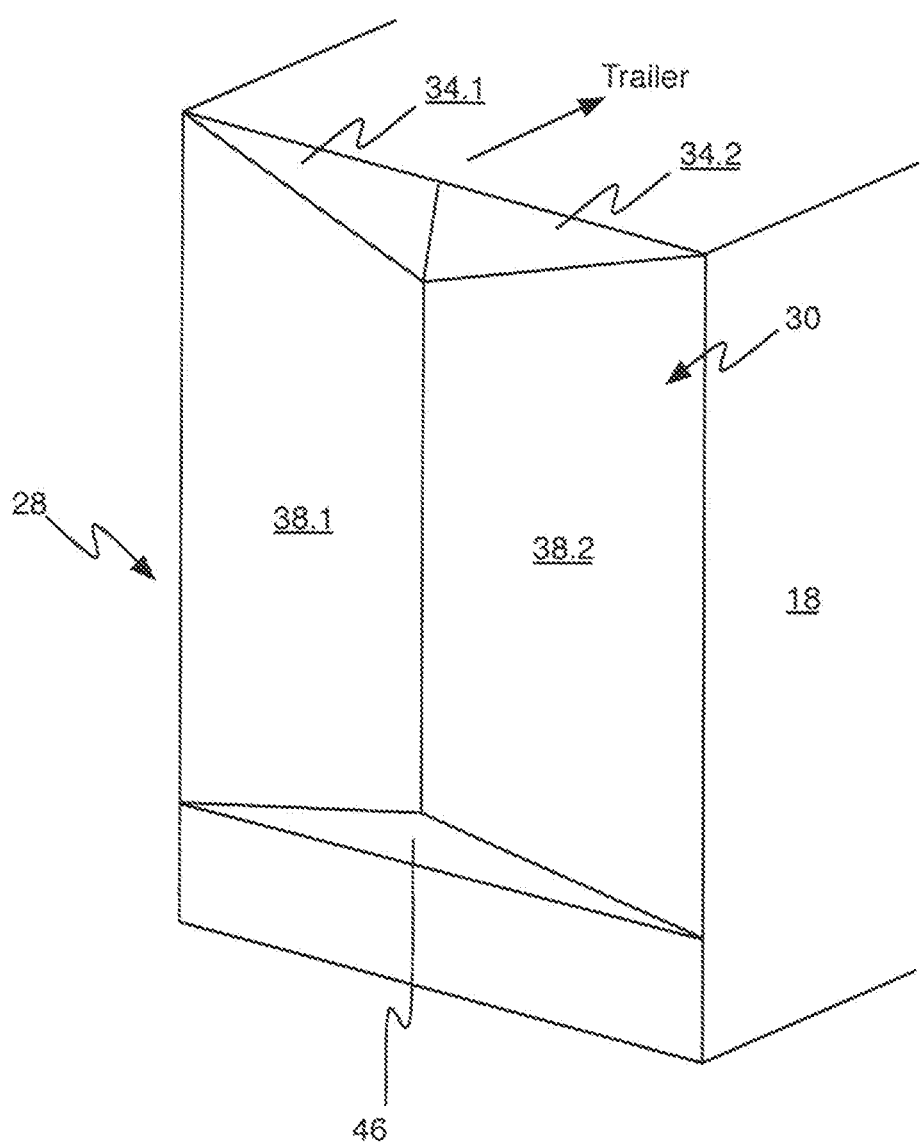
FIG. 21 is a rear-right perspective view of an alternate folding structure, in accordance with at least one embodiment thereof.
Figure 22:
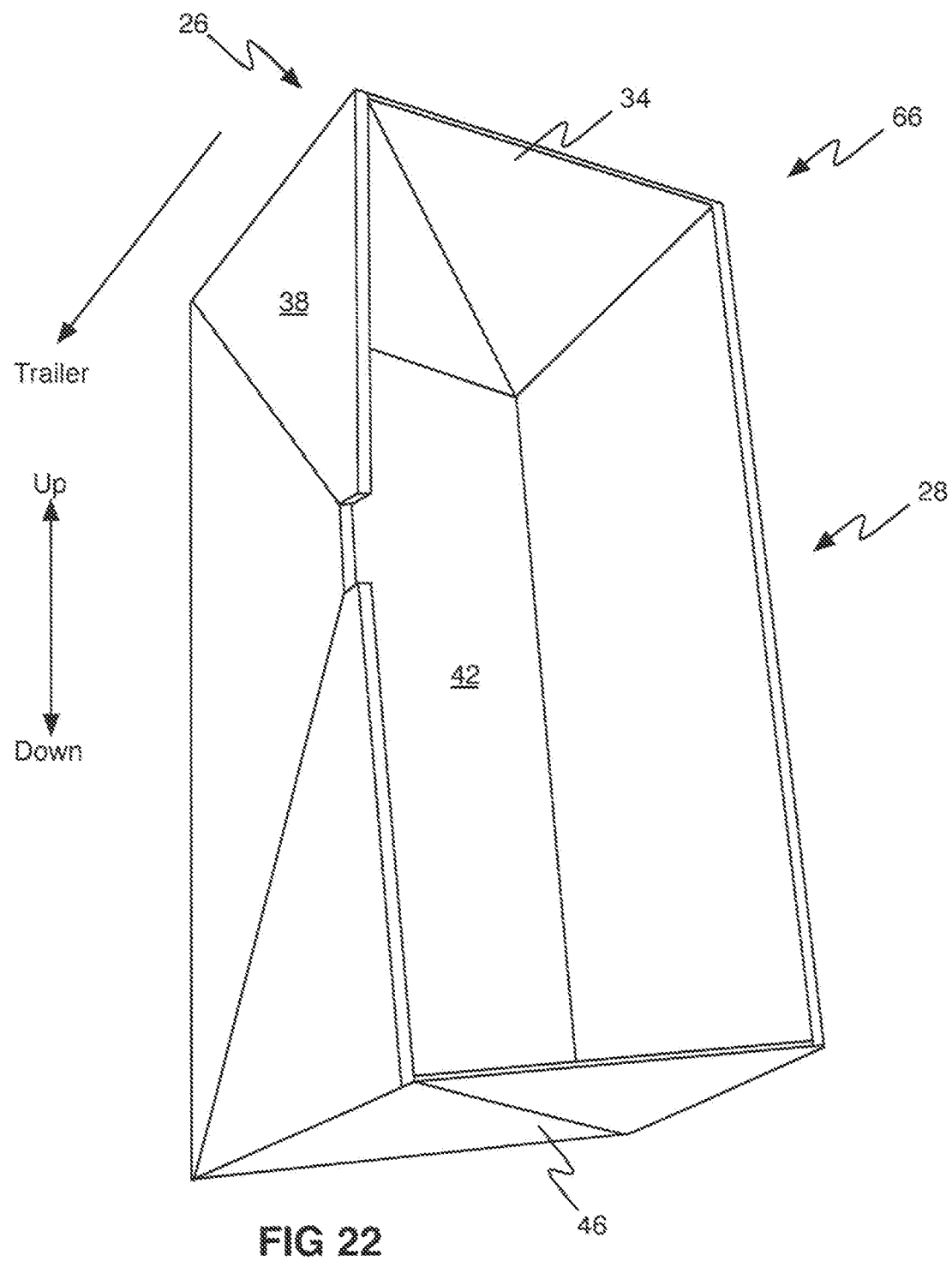
FIG. 22 is a rear-left perspective view of an alternate folding structure, in accordance with at least one embodiment thereof.
Figure 23:
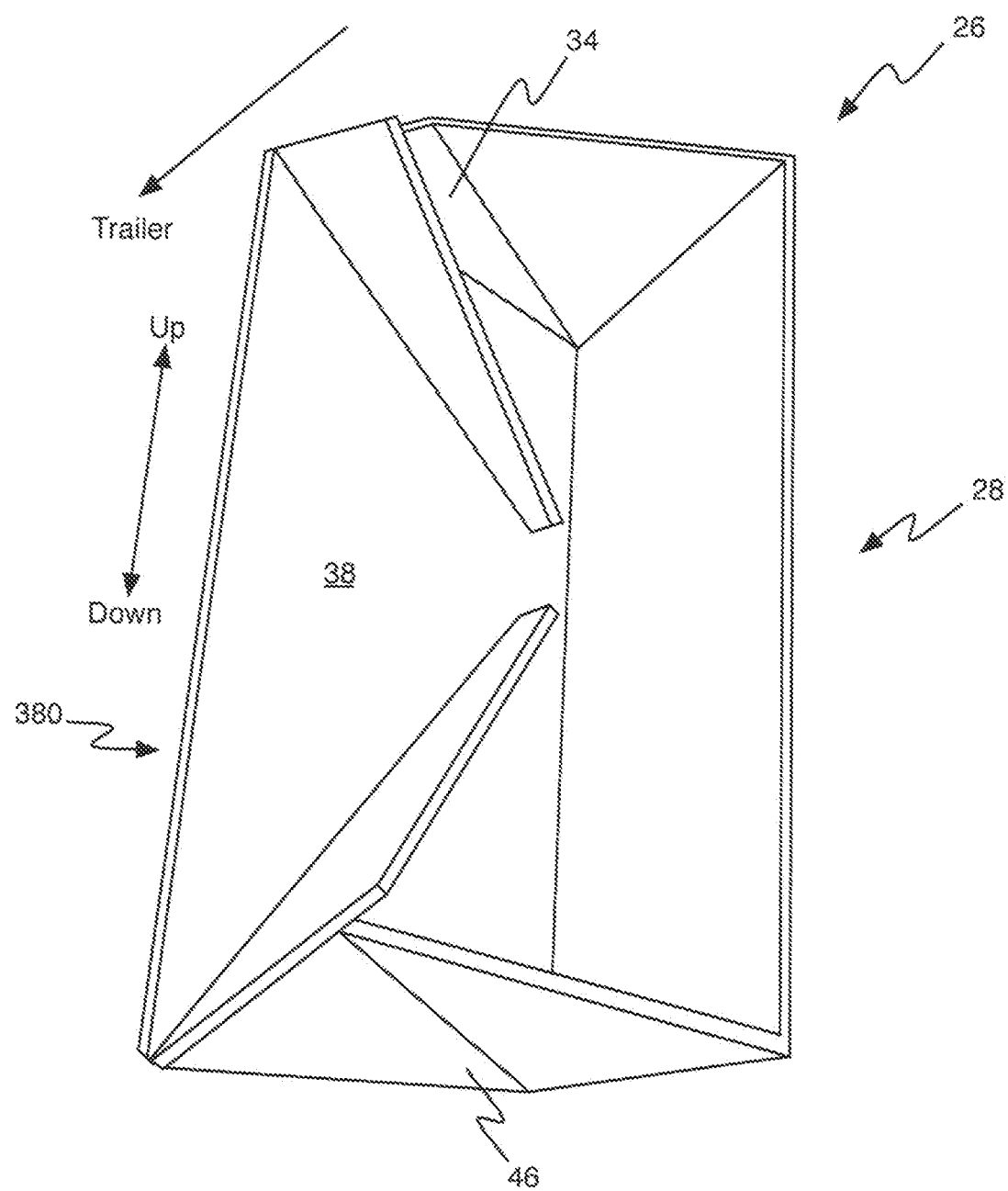
FIG. 23 is a rear-left perspective view of the alternate folding structure of FIG. 22, in accordance with at least one embodiment thereof.
Figure 24:
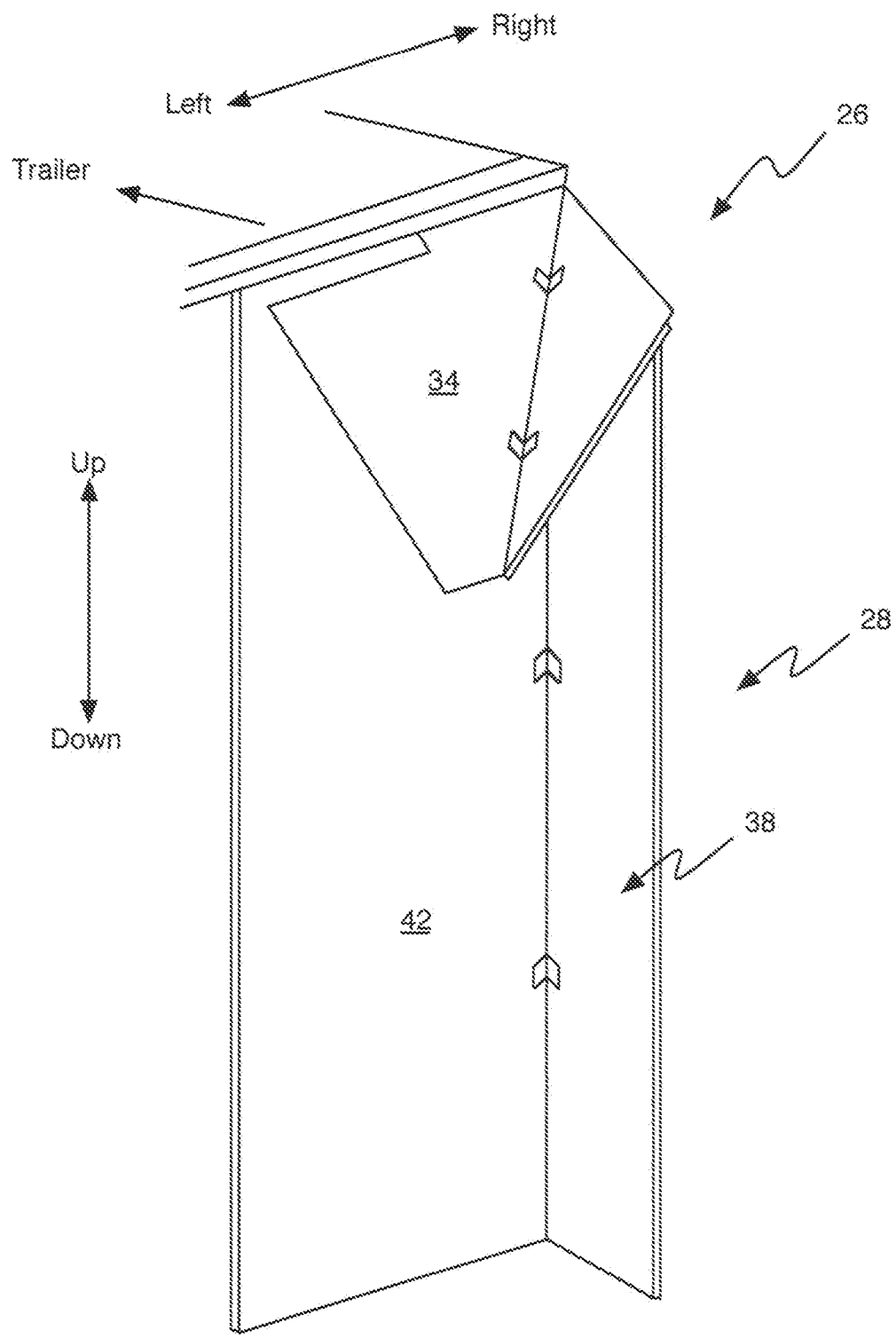
FIG. 24 is a rear-left perspective view of an alternate folding structure, in accordance with at least one embodiment thereof.

Moving now to FIG. 19 illustrating another possible folding structure 28. FIG. 20 is depicting another type of folding structure 28 in the expanded aerodynamic configuration 66 while FIG. 21 depicts the same folding structure 28 in the retracted configuration 30. FIG. 22 is illustrating another type of folding structure 28 in the expanded aerodynamic configuration 66 while FIG. 23 depicts the same folding structure 28 in a semi-retracted configuration 380. Another alternate folding structures 28 is shown in FIG. 24. All the folding structure 28 illustrated in FIG. 19 throughout FIG. 24 are adapted to allow movement between the retracted configuration 30 and the expanded aerodynamic configuration 66 actuated by the actuation mechanism 48 (not illustrated in FIG. 19 throughout FIG. 24)

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A retractable aerodynamic air drag reducing apparatus for reducing the air drag from a rear portion of a vehicle, the retractable aerodynamic air drag reducing apparatus comprising:
  a first half disposed on a first rear portion of the vehicle and a second half disposed on a second rear portion of the vehicle, each half comprising
  a top panel pivotably disposed on an upper portion of the rear portion of the vehicle for moving between an expanded configuration and a retracted configuration;
  a side panel pivotably disposed on a side portion of the rear portion of the vehicle for moving between the expanded configuration and the retracted configuration;
  a bottom panel pivotably disposed on a lower portion of the rear portion of the vehicle for moving between the expanded configuration and the retracted configuration;
  a pair of actuation mechanisms for respectively actuating each half of the retractable aerodynamic air drag reducing apparatus between the expanded configuration and the retracted configuration on a basis of a GPS signal representative of a behavior of the vehicle, each of the pair of actuation mechanisms including a pivotable member operatively connected to two of the panels; and
  a control system comprising
  a low speed limit switch;
  a high speed limit switch, both switches reacting to a vehicle speed input provided on a basis of the GPS signal,
wherein the pair of actuation mechanisms is actuated on a basis of a lower vehicle speed limit signal for actuating each half of the retractable aerodynamic air drag reducing apparatus in the retracted configuration and on a basis of a upper vehicle speed limit signal for actuating each half of the retractable aerodynamic air drag reducing apparatus in the expanded configuration.

2. The retractable aerodynamic air drag reducing apparatus of claim 1, wherein the first half comprises a back frame panel secured to the rear portion of the vehicle, at least one of the top panels, the side panels and the bottom panels being operatively connected to the back frame for moving between the expanded configuration and the retracted configuration.

3. The retractable aerodynamic air drag reducing apparatus of claim 2, wherein the back frame is adapted to pivot between an aerodynamic configuration and a door-opening configuration.

4. The retractable aerodynamic air drag reducing apparatus of claim 1, the pivotable member is substantially round.

5. The retractable aerodynamic air drag reducing apparatus of claim 1, the pivotable member is adapted to pivot about 90-degree to move the panels between the expanded configuration and the retracted configuration.

6. The retractable aerodynamic air drag reducing apparatus of claim 1, the pivotable member is operatively connected to the top panel with a first connecting member and to the bottom panel with a second connecting member, the side panel being operatively connected to at least one of the top panels and the bottom panels to be actuated between the expanded configuration and the retracted configuration.

7. The retractable aerodynamic air drag reducing apparatus of claim 6, the pivotable member is operatively connected to the first connecting member with a first joint and to the second connecting member with a second joint, each joint providing more than one degree of freedom.

8. The retractable aerodynamic air drag reducing apparatus of claim 6, a second end of the first connecting member is connecting the top panel with a pivot including a pivot axis located on an upper side of the top panel when the top panel is in the expanded configuration.

9. The retractable aerodynamic air drag reducing apparatus of claim 1, further comprising an actuator generally disposed in parallel with the rear portion of the vehicle, between the pivotable member and the rear portion of the vehicle.

10. The retractable aerodynamic air drag reducing apparatus of claim 1, a trailing edge of at least one of the top panels, the side panels and the bottom panels further comprises a serrated trailing edge.

11. A vehicle including a retractable aerodynamic air drag reducing apparatus for reducing the air drag from a rear portion of the vehicle, the retractable aerodynamic air drag reducing apparatus comprising:
  a first half disposed on a first rear portion of the vehicle and a second half disposed on a second rear portion of the vehicle, each half comprising
  a top panel pivotably disposed on an upper portion of the rear portion of the vehicle for moving between an expanded configuration and a retracted configuration;
  a side panel pivotably disposed on a side portion of the rear portion of the vehicle for moving between the expanded configuration and the retracted configuration;
  a bottom panel pivotably disposed on a lower portion of the rear portion of the vehicle for moving between the expanded configuration and the retracted configuration;
  a pair of actuation mechanisms for respectively actuating each half of the retractable aerodynamic air drag reducing apparatus between the expanded configuration and the retracted configuration on a basis of a GPS signal representative of a behavior of the vehicle, each of the pair of actuation mechanisms including a pivotable member operatively connected to two of the panels; and
  a control system comprising
  a low speed limit switch; and
  a high speed limit switch, both switches reacting to a vehicle speed input provided on a basis of the GPS signal,
wherein the pair of actuation mechanisms is actuated on a basis of a lower vehicle speed limit signal for actuating each half of the retractable aerodynamic air drag reducing apparatus in the retracted configuration and on a basis of a upper vehicle speed limit signal for actuating each half of the retractable aerodynamic air drag reducing apparatus in the expanded configuration.

12. The vehicle of claim 11, wherein the first half comprises a back frame panel secured to the rear portion of the vehicle, at least one of the top panels, the side panels and the bottom panels being operatively connected to the back frame for moving between the expanded configuration and the retracted configuration.

13. The vehicle of claim 12, wherein the back frame is adapted to pivot between an aerodynamic configuration and a door-opening configuration.

14. The vehicle of claim 11, the pivotable member is substantially round.

15. The vehicle of claim 11, the pivotable member is adapted to pivot about 90-degree to move the panels between the expanded configuration and the retracted configuration.

16. The vehicle of claim 11, the pivotable member is operatively connected to the top panel with a first connecting member and to the bottom panel with a second connecting member, the side panel being operatively connected to at least one of the top panels and the bottom panels to be actuated between the expanded configuration and the retracted configuration.

17. The vehicle of claim 16, the pivotable member is operatively connected to the first connecting member with a first joint and to the second connecting member with a second joint, each joint providing more than one degree of freedom.

18. The vehicle of claim 16, a second end of the first connecting member is connecting the top panel with a pivot including a pivot axis located on an upper side of the top panel when the top panel is in the expanded configuration.

19. The vehicle of claim 11, further comprising an actuator generally disposed in parallel with the rear portion of the vehicle, between the pivotable member and the rear portion of the vehicle.

20. The vehicle of claim 11, a trailing edge of at least one of the top panels, the side panels and the bottom panels further comprises a serrated trailing edge.

* * * * *